United States Patent
Dorum et al.

(10) Patent No.: US 11,709,070 B2
(45) Date of Patent: Jul. 25, 2023

(54) LOCATION BASED SERVICE TOOLS FOR VIDEO ILLUSTRATION, SELECTION, AND SYNCHRONIZATION

(71) Applicant: Nokia Technologies Oy, Espoo (FI)

(72) Inventors: Ole Henry Dorum, Chicago, IL (US); James Lynch, Chicago, IL (US); Jaakko Raikisto, Nakkila (FI); Aaro Tuukkanen, Mansikkamäki (FI); Ville Nupponen, Rautjärvi (FI); Mikko Halava, Espoo (FI); Teemu Hakala, Renko (FI)

(73) Assignee: Nokia Technologies Oy, Espoo (FI)

( * ) Notice: Subject to any disclaimer, the term of this patent is extended or adjusted under 35 U.S.C. 154(b) by 268 days.

(21) Appl. No.: 14/832,825

(22) Filed: Aug. 21, 2015

(65) Prior Publication Data
US 2017/0052035 A1 Feb. 23, 2017

(51) Int. Cl.
*G01C 21/36* (2006.01)
*G01C 21/30* (2006.01)
(Continued)

(52) U.S. Cl.
CPC ......... *G01C 21/3667* (2013.01); *G01C 21/30* (2013.01); *G01C 21/3492* (2013.01);
(Continued)

(58) Field of Classification Search
CPC ............ G01C 21/3614; G01C 21/3617; G01C 21/3641; G01C 21/3667; G01C 21/3676;
(Continued)

(56) References Cited

U.S. PATENT DOCUMENTS

| 7,058,282 B2 * | 6/2006 | Komatsu ............. G11B 27/107 386/243 |
| 8,931,011 B1 * | 1/2015 | Hitchcock ........ H04N 21/43072 725/52 |

(Continued)

FOREIGN PATENT DOCUMENTS

| EP | 2176798 B1 * | 11/2016 | ............. G01C 21/20 |
| JP | 2005110111 A * | 4/2005 | ............... H04N 5/91 |

(Continued)

OTHER PUBLICATIONS

Rod Trent, "Comparing Treadmill and Outside Running Using the Microsoft Band", Windows Supersite (Mar. 23, 2015).*

(Continued)

*Primary Examiner* — David N Werner
(74) *Attorney, Agent, or Firm* — Mintz Levin Cohn Ferris Glovsky and Popeo, P.C.

(57) ABSTRACT

Methods and apparatus, including computer program products, are provided mapping. In some example embodiments, there may be provided a method including generating, by a user equipment, a user interface view including a map and a polyline representative of a route along the map; and generating, by the user equipment, the polyline to include at least one graphically distinct indicator along the route, wherein the at least one graphically distinct indicator, when selected at the user interface, initiates presentation of a video recorded at a location on the route where the at least one graphically distinct indicator is located. Related apparatus, systems, methods, and articles are also described.

15 Claims, 21 Drawing Sheets

(51) Int. Cl.
*G06V 20/56* (2022.01)
*G01C 21/34* (2006.01)
*G06F 3/04842* (2022.01)
*H04N 7/18* (2006.01)
*G06F 3/0482* (2013.01)

(52) U.S. Cl.
CPC ..... *G01C 21/3697* (2013.01); *G06F 3/04842* (2013.01); *G06V 20/56* (2022.01); *H04N 7/183* (2013.01); *G06F 3/0482* (2013.01)

(58) Field of Classification Search
CPC ............ G01C 21/3492; G01C 21/3647; G06F 3/04842
See application file for complete search history.

(56) References Cited

U.S. PATENT DOCUMENTS

| | | | | |
|---|---|---|---|---|
| 2003/0214582 | A1* | 11/2003 | Takahashi | H04N 21/440281 348/E7.071 |
| 2007/0150188 | A1 | 6/2007 | Rosenberg | |
| 2009/0254265 | A1* | 10/2009 | Reddy | G01C 21/3647 701/532 |
| 2011/0102637 | A1* | 5/2011 | Lasseson | H04N 25/50 348/E5.051 |
| 2011/0270516 | A1* | 11/2011 | Kopf | G01C 21/3614 701/532 |
| 2012/0062779 | A1 | 3/2012 | Sambongi | |
| 2015/0030308 | A1 | 1/2015 | Yang et al. | |
| 2017/0089714 | A1* | 3/2017 | Liu | G01S 19/42 |
| 2022/0408053 | A1* | 12/2022 | Jung | H04N 7/183 |

FOREIGN PATENT DOCUMENTS

| | | | | |
|---|---|---|---|---|
| KR | 1020100083037 A | * | 7/2010 | ........... G08G 1/0112 |
| SE | 1451095 A1 | * | 4/2015 | ............. G06T 19/00 |
| WO | WO 03056560 | | 7/2003 | |
| WO | WO 2007057696 | | 5/2007 | |
| WO | WO 2011151507 | | 12/2011 | |

OTHER PUBLICATIONS

International Search Report for PCT/FI2016/050566.*
Written Opinion for PCT/FI2016/050566.*
Machine translation of JP-2005110111 A (Year: 2020).*
Machine translation of KR 10-2010-0083037-A (Year: 2010).*
Youtube, Microsoft Band Review, 2015, 4 pages.

* cited by examiner

Geo-referenced user created video; including simple 'dot' based position trace

Geo-referenced Video displayed as 'moving' video on 2D map. Either we can show multiple frames at once, or show the video as a moving thumbnail on the 2D map.

Example showing how a GPS trace may be converted into a geo-referenced video using JourneyView imagery. Playback is shown on the 2D map instead of a standard fixed window.

Add or edit geo-reference data to video that does not have positioning using 2D map display. Metadata from map database may be linked to the edited view frame (such as building, POI, road link, etc).

800

LOCATION BASED SERVICE TOOLS FOR VIDEO ILLUSTRATION, SELECTION, AND SYNCHRONIZATION

FIELD

The subject matter disclosed herein relates to location services including maps and videos linked to maps.

BACKGROUND

Navigation systems have become more prevalent today. These navigation systems can be found in devices, such as smartphones, watches, personal navigation systems, automotive navigation systems, and/or the like. These navigation systems may also access web-based services that can provide location based services that augment the location services provided by navigation systems.

SUMMARY

Methods and apparatus, including computer program products, are provided video data linked to maps.

In some example embodiments, there may be provided a method including generating, by a user equipment, a user interface view including a map and a polyline representative of a route along the map; and generating, by the user equipment, the polyline to include at least one graphically distinct indicator along the route, wherein the at least one graphically distinct indicator, when selected at the user interface, initiates presentation of a video recorded at a location on the route where the at least one graphically distinct indicator is located.

In some example embodiments, one of more variations may be made as well as described in the detailed description below and/or as described in the following features. The at least one graphically distinct indicator may represent an indication of a speed of a camera recording the video at the location. The user interface view including the map, the polyline, and the at least one graphically distinct indicator may be presented. The at least one graphically distinct indicator may include a color, a style, and/or a shading, wherein the color, the style, and/or the shading are varied in accordance with the speed. A first graphically distinct indicator may be graphically different from a second graphically distinct indicator to indicate a difference in the speed. The route along the map may include map data including location information and time information, wherein the time information enables a determination of the speed at the location corresponding to the at least one graphically distinct indicator.

In some example embodiments, there may be provided a method including generating a selection window on a user interface view presenting map data and a polyline representative of a route through the map data; sending a query for at least one video recorded on the route and recorded within a region bound by the selection window; receiving, in response to the query, at least a portion of the polyline including the at least one video recorded on the route and recorded within the region bound by the selection window; and presenting the portion of the polyline to enable selection and viewing of the least one video.

In some example embodiments, one of more variations may be made as well as described in the detailed description below and/or as described in the following features. In response to the query, the map data including geographic features in a geographic region defined by the region bound by the selection window may be received. The map data may include at least one of: at least one road segment database record, at least one node database record, at least one pedestrian segment database record, at least one orientation node database record, and at least one image data record. The query may include information representative of the selection window and the route to enable a determination of the at least one video selected based on location information and/or time information stored with, or linked to, the at least one video. The route may include a street name, a pedestrian route, a footprint of a building, a footprint of a point of interest, a geographic area, and/or the point of interest. A playback speed of the at least one video based on a shape of the polyline, a speed associated with the portion of the polyline, and/or the map data associated with the portion of the polyline may be varied. The at least one video within the region may be presented sequentially based on time. The query may be sent to a server including video data and the at least one video, wherein the video data is linked to, or stored with, at least the map data including location information to enable queries for the at least one video. A location of the at least one video may be adjusted to the location information of the map data.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1A:
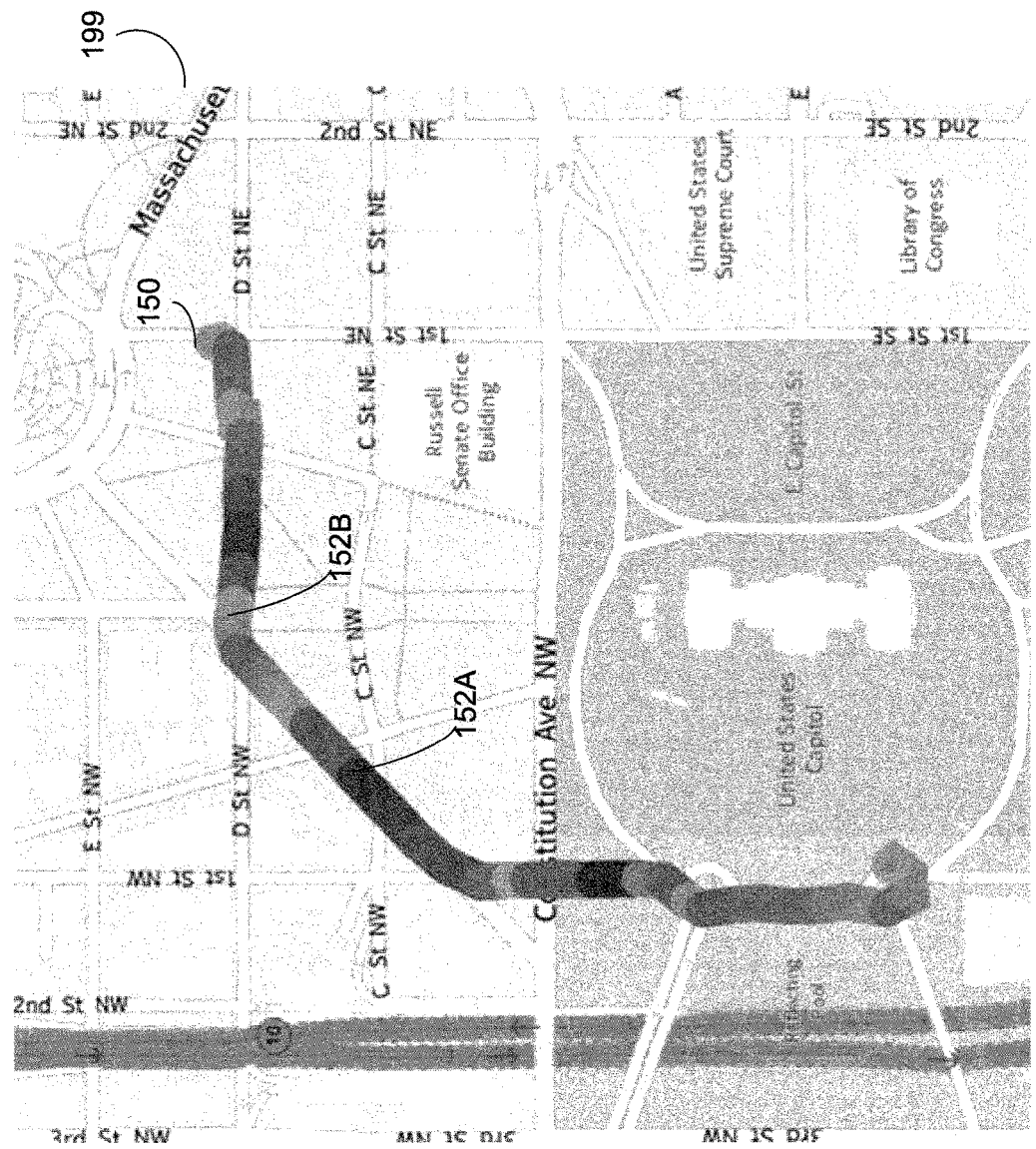
FIG. 1A depicts an example of a polyline, in accordance with some example embodiments.

Like labels are used to refer to same or similar items in the drawings.

DETAILED DESCRIPTION

Navigation systems provide map data to enable users to navigate. Videos may be used in conjunction with digital maps. For example, recorded video can be stored and associated with map data. When this is the case, a user may select a video associated with a given route or spatial region, for example. From a user perspective, the integration of maps and video data may be confusing and not easy to use.

Velocity-Based Polylines

Video may, as noted, be associated with map data including locations and/or routes presented at a user equipment providing navigation, for example. FIG. 1A depicts an example of user interface view 199 presenting a map including a polyline 150, in accordance with some example embodiments. The polyline 150 may represent a route. Moreover, the route may have one or more associated videos. For example, selection of a portion polyline 150 may play a video corresponding to the selected location. To illustrate further, the video may provide a walking view, a driving view, or a biking view at the selected location. In the example of FIG. 1A, polyline 150 includes a first portion at 152A and a second portion at 152B, so selection of first portion 152A may cause a first video corresponding to the location at 152A to be displayed, while selection of second portion 152B may cause a second video corresponding to the location at 152B to be displayed.

In some example embodiments, the polyline 150 may include a graphically distinct indication of speed of the video camera that captured the video. Referring to portion of the polyline at 152A, the polyline portion 152A is darker in the example of FIG. 1A, when compared to the polyline portion at 152B.

In some example embodiments, a darker polyline 152A graphically indicates that the speed of a video recorder (which recorded the video associated with 152A) is greater than the speed of a video recorder at 152B (which recorded the video associated with 152B). In this way, user interface view 199 graphically indicates at a user interface of a user equipment the speed associated with the video(s) along the route of polyline 150. Moreover, selection (for example, scrolling over and the like) of each portion 152A and/or 152B may provide additional metadata, such as the actual or relative speed. For example, scrolling over 152A may present at the display a speed value, such as 45 miles per hour, representative of the speed of the video recorder of the portion at 152A. The selection may also present a relative speed indicator, such as a picture or icon of a car to represent driving speed. Likewise, scrolling over 152B may for example present a speed value of 4 miles per hour or an icon of a person walking. In this way, a user can select videos along a route according to speed.

Although the previous example describes the video of the faster video camera being darker than the video of the slower camera, the video of the faster camera may be depicted along the polyline as being lighter. Moreover, although the previous example describes the video of the faster video camera being darker than the video of the slower camera, the graphical indication of speed may be indicated in other ways, such as via color, style change (for example, width change of the polyline). Moreover, the colors may be mapped to a specific speed. For example, 0-3 miles per hour may be mapped to a first color, 3-10 may be mapped to a second color, 10-30 may be mapped to a third color, and so forth. Further, the orientation of the camera may also be indicated graphically as well (for example, with an arrow or other indicator).

In some example embodiments, a user equipment including a video camera may record a video. And, this recorded video may be associated with location information where the video was taken (or the location of the camera) as well as other metadata including camera orientation (for example, direction where the camera is pointing), time, and the like. The location information may comprise global navigation satellite system (GNSS) receiver, such as Global Positioning System (GPS), although other types of location information may be used as well. For example, the camera orientation may be presented by a rotation matrix.

In some example embodiments, the user equipment may record the video. And, while recording, store GPS coordinates at predetermined time intervals, such as every five seconds. The location and time information may be stored with, or linked to, the video. This video including the GPS coordinates and time information may be uploaded to a server where the video can be associated with map data for a navigation system. For example, at GPS coordinates, camera orientation, and/or time may be stored with each video frame. Given the location and time, the speed may be determined for the video recorder taking the video. As such, when the user equipment presents, at a user interface, a user interface view such as view 199, the polyline 150 may be generated to graphically indicate speed for portions of the video, in accordance with some example embodiments.

Figure 1B:
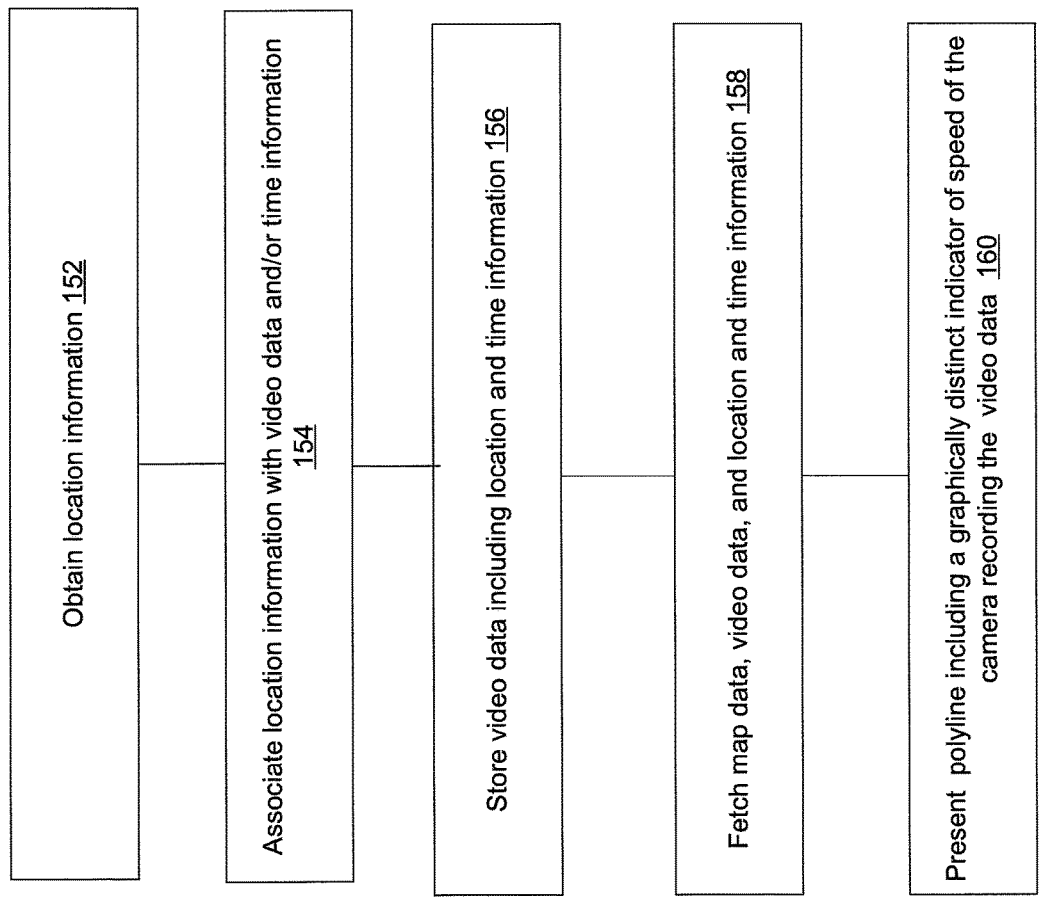
FIG. 1B depicts an example of a process for generating a polyline, in accordance with some example embodiments.

FIG. 1B depicts an example process for graphically indicating route video speed, in accordance with some example embodiments.

At 152, a user equipment may, while it is recording a video, fetch location coordinates from for example a source of location information, such as GPS information, in accordance with some example embodiments. For example, the user equipment may fetch (or otherwise obtain) GPS location information. Moreover, the fetching may be performed at a predetermined interval, such as every 5 seconds.

At 154, the recorded video data may be associated with location information and/or time information. For example, the location information and/or time information (or frame number within the video, for example) may be linked to, or stored with, portions of the recorded video. To illustrate, the recorded video may be kept at a separate server and linked to map data including location information, and/or the recorded video may be stored with map data including location information.

At 156, location information and/or time information may be stored along with, or linked to, the video data, in accordance with some example embodiments. For example, the recorded video data, location information for the video data, and the time information for the video data may, at 154, be stored at (or linked to) a server, such as a navigation system server including map data. The video data (also referred to herein as video) may comprise data representative of a video recorded by for example a camera, and this video data may include associated metadata. The navigation system server may store the videos (which include location information, time information, and/or other metadata) from various user equipment including cameras. And, the navigation system server may store this information so that it is associated with map data, such a map routes or map locations, to enable viewing at a user equipment, when the map data is accessed. For example, a web-based service may provide the server including the map data and video to allow a plurality of user to access the video and map data.

In some example embodiments, the video may be stored with location information and an explicit indication of time. While in some example embodiments, the location information may be stored at regular intervals such as every 5 seconds and/or other intervals in which case, time information is implicit in the stored location information (for example, 5 second intervals).

At 158, a user equipment may fetch map data for presentation at a user interface, in accordance with some example embodiments. For example, the user equipment may fetch map data, such as a route corresponding to polyline 150 as well as location and time information. At 160, the route corresponding to polyline 150 including the graphical indications of speed as shown at 152A-B may be presented at a user interface of the user equipment, such as a navigation system. For example, the user equipment may generate view 199 including the polyline 150 and graphical indicators 152A-B.

In some example embodiments, the map data obtained at 158 may be stored within the video. For example, the associated map link identifier (ID), street name, road direction, or other map related attributes may be embedded into the video.

In some example embodiments, the map data including position and other metadata may be stored externally from the stored video. When this is the case, an external time-synchronization database may store a table entry for each video file, wherein each entry may include a list of video frame numbers or timestamp markers. Each marker may include geo-position, orientation, and other map related information. When a video is accessed, the database may associate the video timestamp (or frame-number for example) with the video markers stored under the associated video table entry. As such, the video may remain stored as a standard video, without geo-spatial information. When this is the case, the video may be turned into a geo-spatial video on demand using the video identifier, video timestamps, and time-sync database. Spatial queries and clipping may be implemented by using the time-sync database, wherein the actual (large) video files may not need to be accessed to perform the queries. In some example embodiments, the user equipment may generate speed values at different locations based on metadata provided by a navigation system server, while in some example embodiments, the server may determine the speed. Regardless, the speed information enables the polyline to be presented at the user equipment's user interface with graphical indications of speed as shown at 152A-B.

In some example embodiments, user equipment may generate polyline 150 as an overlay indicative of a route, and then generate, based on determined speed, graphical indications of speed 152A and 152B. The generated polyline 150 including the graphically distinct indicators 152A-B may then be presented at a user interface of the user equipment. In this way, a viewer of polyline 150 including graphically distinct indicators 152A-B can assess the speed of the video recording. For example, a user may be able to tell whether a portion of a video along a route was taken while standing still, walking, running, and/or the like.

Video Synchronization

In some example embodiments, there may be provided a way to synchronize videos captured at different times and/or locations. When one or more videos are taken and associated with a route, those videos may be taken at different locations, at different times, and/or from different user equipment including cameras/video recorders. For example, two or more videos (which are taken at a single location but at different times) may be synchronized and then presented at a user interface of a user equipment.

Figure 2A:
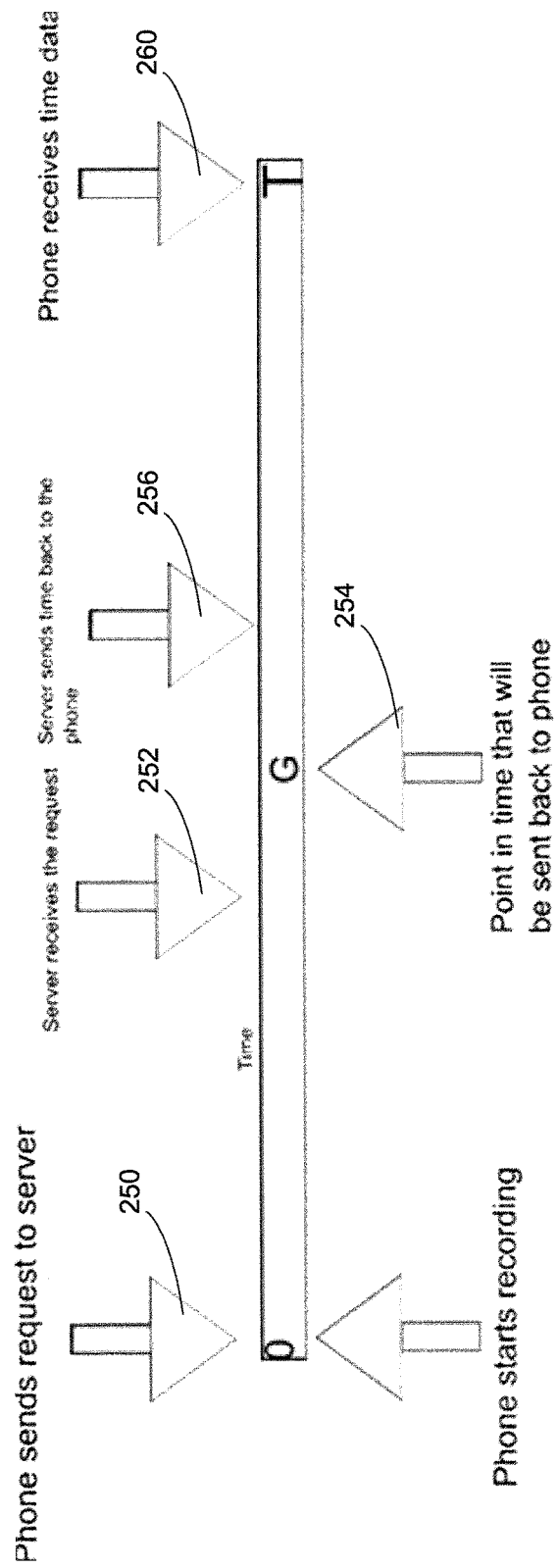
FIG. 2A depicts an example of a process for synchronizing video, in accordance with some example embodiments.

FIG. 2A depicts an example process 200 for video synchronization, in accordance with some example embodiments.

At 250, a user equipment begins recording a video, which may trigger sending a request to a server for time data, such as a time stamp. The server may be a server associated with a navigation system providing map data and videos associated with locations and/or routes. At 252, the server may receive the request, in which case the server may respond, at 256, to the user equipment with the requested time information, such as the time stamp, G. At 260, the user equipment may receive at time T, the time information, such as the time stamp, so that the user equipment can store the time stamp (as well as location information) with the recorded video.

The user equipment may, as noted, receive, at 260, time stamp G, and this time stamp may be adjusted for time delays associated with requesting and receiving the time stamp. For example, when the user equipment receives at time T the time stamp G, time T represents an estimate of the total round trip delay and time stamp G represents the time when the server received the request and generated the time stamp. To estimate a recording start time (which occurred at 250, "0"), G may be reduced by time T divided by 2 (recording start time=G−(T/2)). The following provides a numeric example. The user equipment may start recording and send the request at 250 to a server. In response, the server may send back time stamp G, 12:00:00:500 16.4.2015 (500 milliseconds after noon, 16.4.2015). But the user equipment receives this time stamp at time T, which is 1 second after the user equipment started recording the video. Video start time may be approximately 12:00:00:000 (for example, G−(T/2)=12:00:00:500-(1000 ms/2)). As such, the video's recording was started approximately at noon, 12:00:00:000.

After a user equipment receives at 260 the time stamp (which may be adjusted as noted above) from the server, the video including location and time stamp information may also be uploaded to a server. Moreover, one or more other user equipment may upload to the server video including location and time stamp information (which may be adjusted as noted). As such, the plurality of videos may be synchronized according to time provided by the server (or one or more servers having a common time base). Later, when a video along a route is selected for display, a user equipment can synchronize videos according to a primary video selected at for example a user interface. For example, a user may select, via a user interface, video A as a primary video and then select video B as another video to be synchronized with video A. In this example, video A's starting time is 11:59:55 and B's 12:00:00. In this example, video A starts playing from the beginning, and video B starts to play after five seconds from the start of video A, and the sequence of video A and B play is synchronized in accordance with the common time source, such as the above-noted server.

Figure 2B:
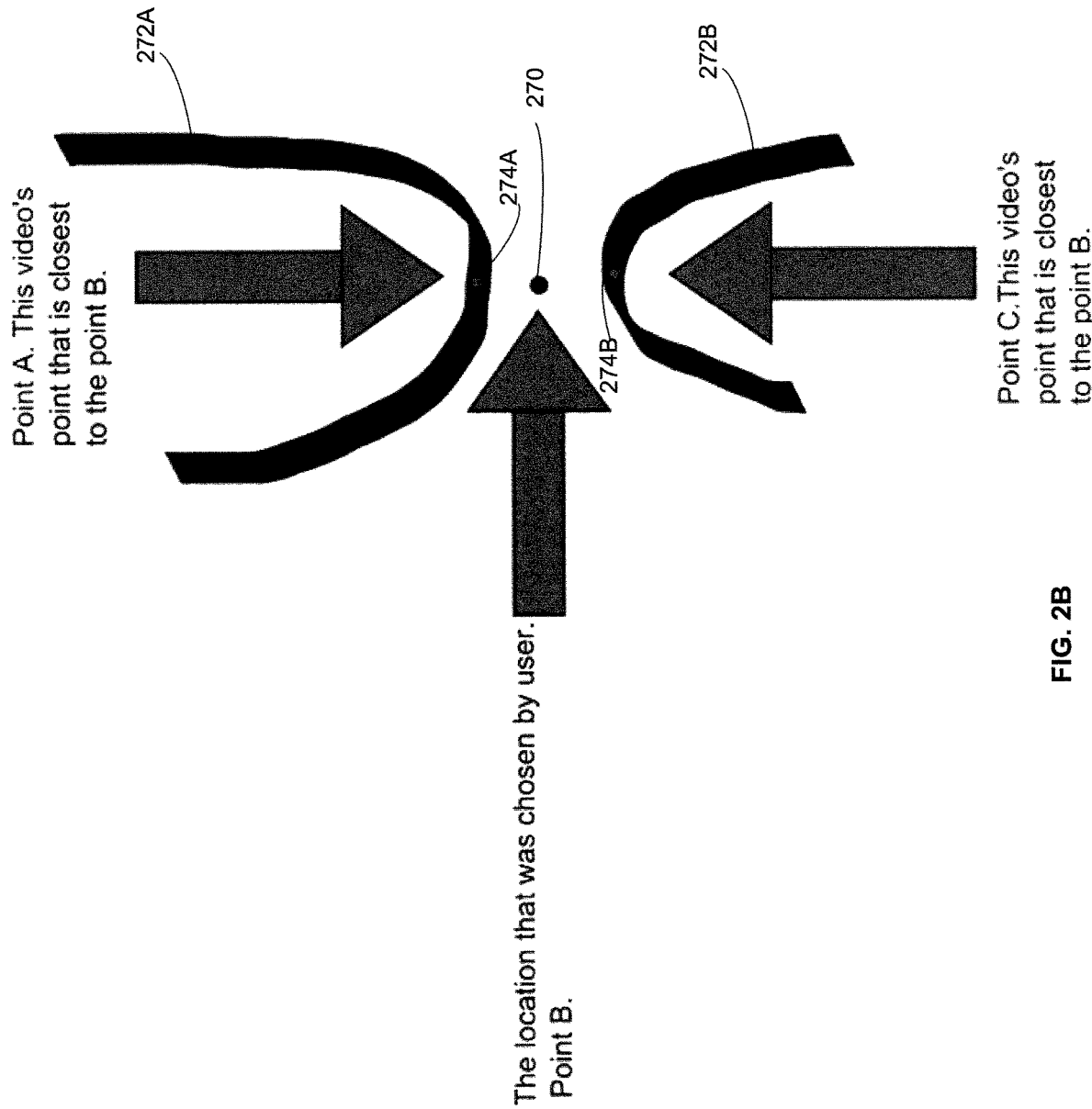
FIG. 2B depicts an example of synchronizing video, in accordance with some example embodiments.

FIG. 2B depicts an example of video synchronization based on location, in accordance with some example embodiments. FIG. 2B depicts an example of a user interface view that may be presented at a user equipment's user interface. The user interface view includes polylines 272A-B, each of which corresponds to a route including associated videos. To synchronize videos according to their location, a user may choose the videos to be synchronized and/or a point 270 from a map. Next, videos that are close to the point 270 may then be identified via a query to a navigation system server. Because videos include location coordinates and time information, a comparison of route videos can be performed according to their recoding locations. This comparison may (or may not) take into account time. For example, point A 274A and point C 274B may be identified as closest to the selected point B 270. This determination may be performed based on a distance threshold that is defined at the user interface for example, or based on a default or programmatically defined threshold. For example, the videos recorded in the opposite sides of the same street may be identified as recorded substantially at the same location since the distance of the recording locations are below the threshold, even if the GPS coordinates of the recording locations may be different. The distance threshold may be defined by meters, as 5 m, 10 m, 20 m, 100 m, and so forth as illustrative and non-limiting examples. In this example, the user equipment may present playback of videos from points A and C simultaneously without taking into account time synchronization, although time synchronization may also be taken into account as well (in which case the play back sequence may be dictated by time as well as location). To illustrate further, videos associated with rally cars as they drive the same route but starting the race at different times can be synchronized by location (without time synchronization) to compare different drivers. By way of another example, that two videos shot along the same street but recorded in opposite direction of travel. In this example, when playing the two videos, the frames may be synchronized by location, such that the video for opposite direction of travel is played in reverse.

Area Selection Tool

Figure 3A:
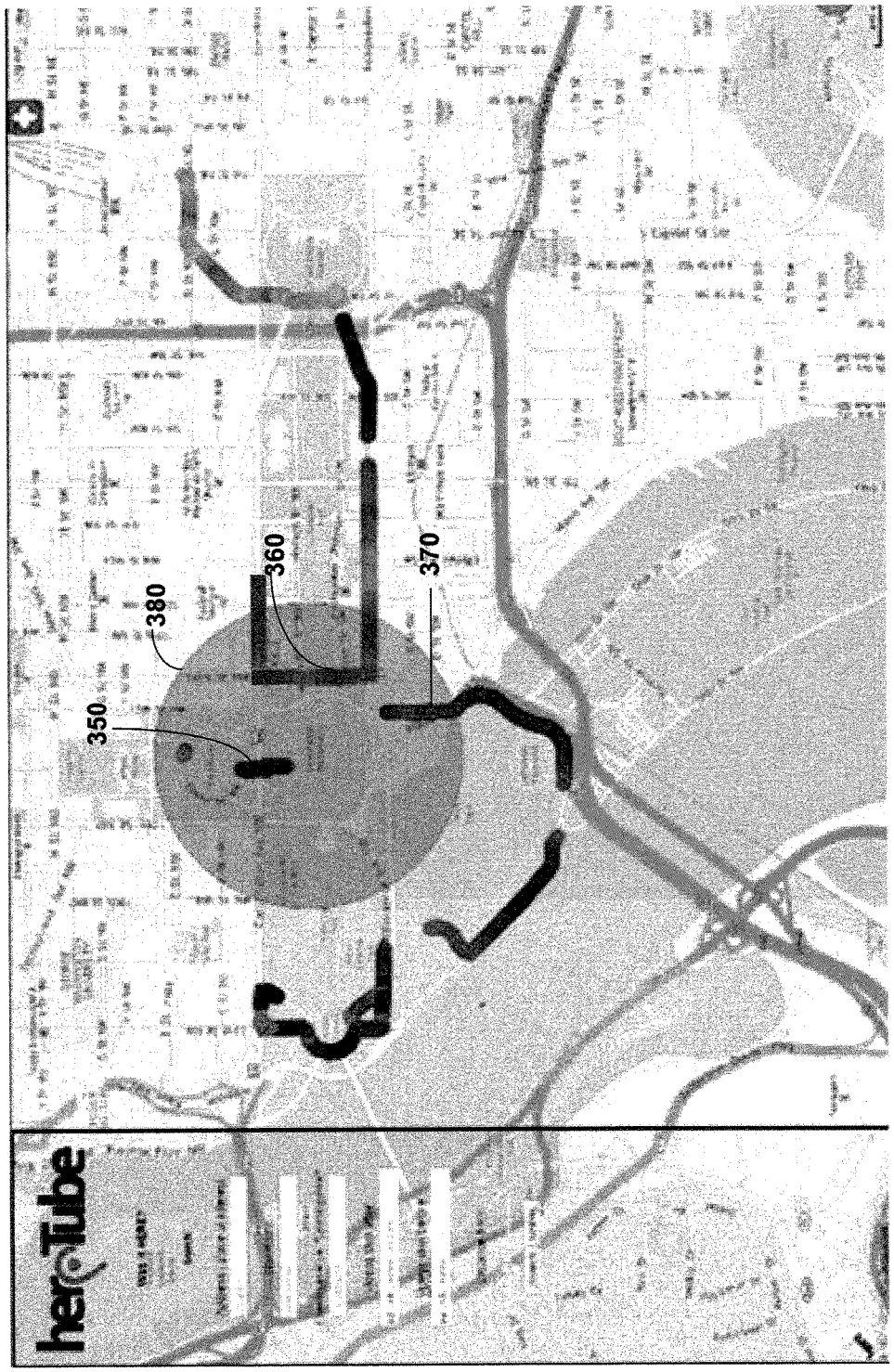
FIGS. 3A-3D depicts example of video selection, in accordance with some example embodiments.

FIG. 3A depicts polylines 350, 360, and 370 and a selection window 380, in accordance with some example embodiments. Each of the polylines may have one or more videos associated with the route. For example, user equipment may present one or more videos along polyline 350 providing views of the route.

FIG. 3A depicts a selection window 380, in accordance with some example embodiments. This selection window 380 may trigger a search for, and presentation of, videos according to location bound by the selection window 380. For example, videos taking place only within the selection window 380 may be presented at the user equipment. To illustrate, polyline 360 may be associated with one or more videos, but only portions of the video occurring within selection window 380 will be presented for viewing at the user equipment, and those outside selection window 380 may be blocked or inhibited from presentations.

Although FIG. 3A depicts a circular selection window, other shapes including polygons may be used for the selection window as well. For example, the area selection tool may comprise a curved shape, a rectangle, a bounded region, a zip-code region, a geo-political boundary, a functional class, a street name, and/or the like.

Figure 3B:
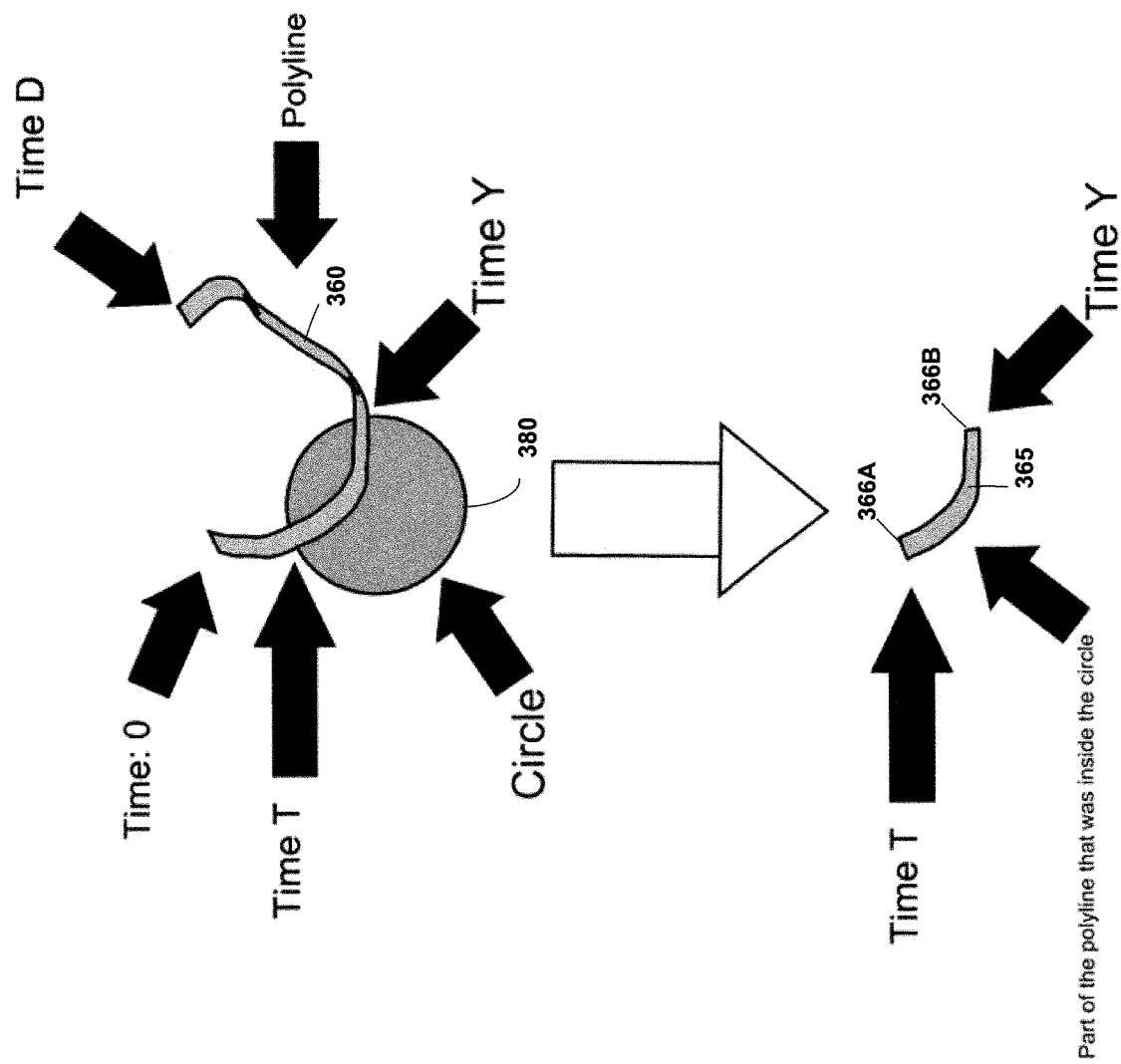

FIG. 3B depicts selection window 380 selecting a portion of polyline 360, in accordance with some example embodiments. The polyline 360 may include a route having one or more videos along the route. However, only a portion of the polyline 360 is located within selection window 380. As such, the user equipment may, based on the selection window, query for the videos located within the location of the selection window and/or only present a portion 365 of the polyline located within the geographic area associated with selection window 380.

In some example embodiments, the selection window may be configured on a user interface of the user equipment. For example, a touch screen or mouse may be used to vary the selection window 380. Once the selection window is configured on the user interface, the user equipment may send the selection window or a query corresponding to the selection window (for example, a query including a center point and radius) to a server that chooses all location-time combinations that are inside the selection window 380. The server may then respond with e the new polyline 365 bound by the selection window 380 as well as the video(s) associated with the new polyline, so that the user equipment can present the video(s) taken in the selection window. In the example of FIG. 3B, clicking on the new polyline 365 plays a video starting at time and location 366A (first edge of the selection window) and ending at time and location 366B (other edge of selection window).

Figure 3C:
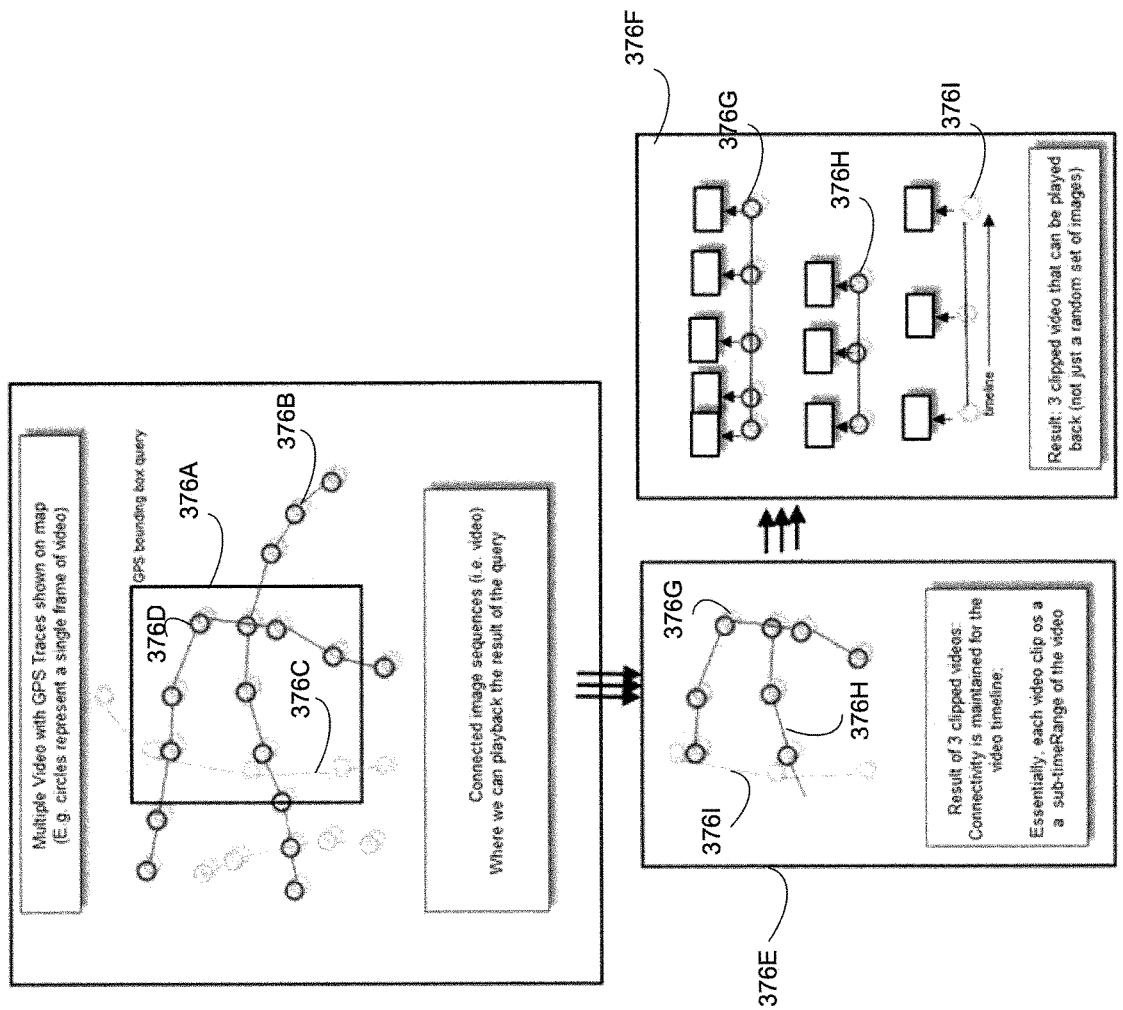

FIG. 3C depicts another selection window 376A selecting three videos 376B-D. In this example, the result of the clipped video is shown at 376E. An example playback sequence is depicted at 376F. The sequence may be based on time, so that the frames of video are ordered with respect to time. Specifically, the frames of video 376G (which corresponds to the portion of 376D within the selection window 376A), video 376H (which corresponds to the portion of 376B within the selection window 376A), and video 376I (which corresponds to the portion of 376C within the selection window 376A) are arranged in a time sequence so that the frames within the selection window are presented in sequential, time order. As such, the user interview may only present the clipped videos bound by selection window 376A.

Figure 3D:
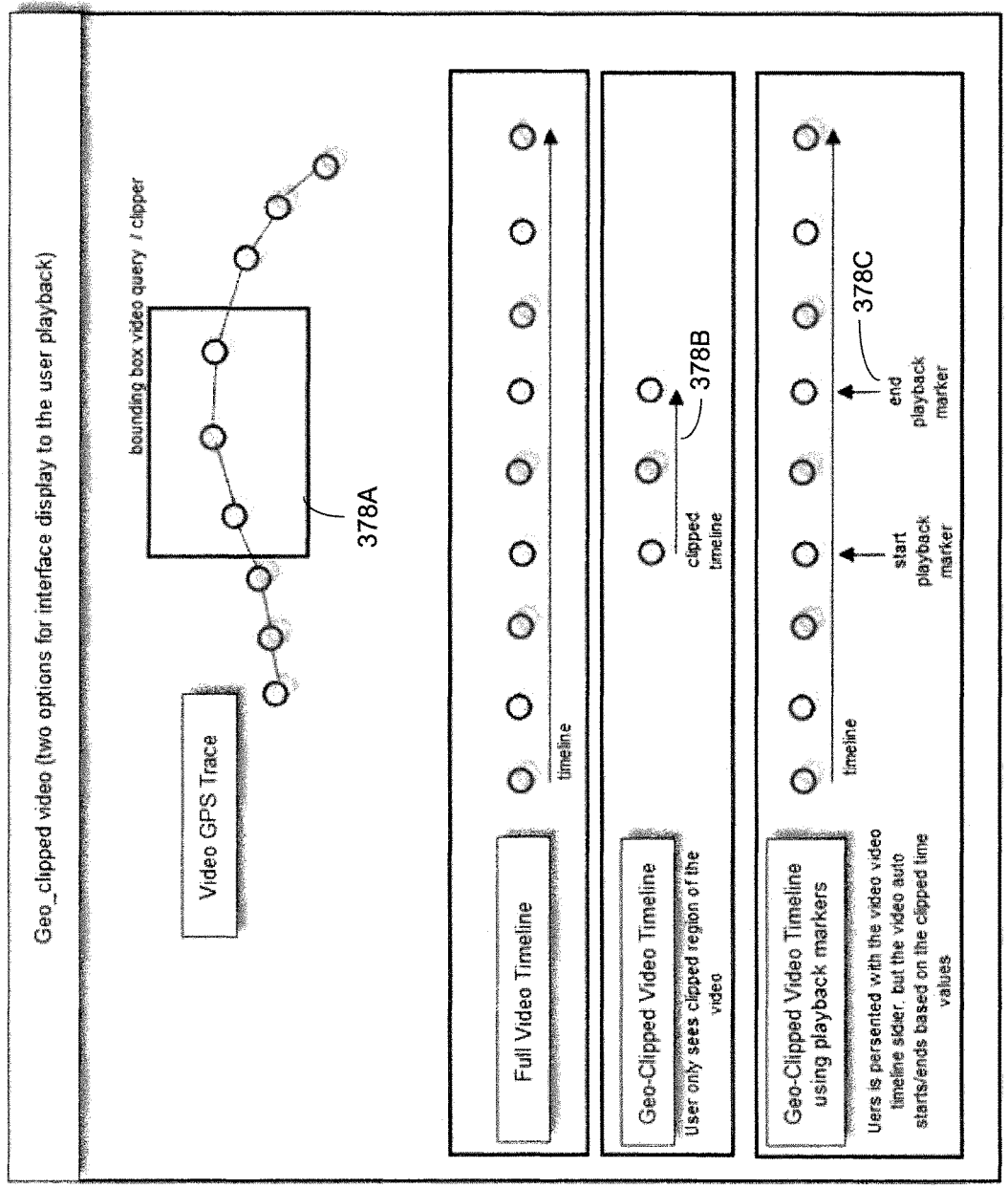

FIG. 3D depicts another example of a selection window 378A selecting a portion of a route associated with a video comprising one or more frames (represented by circles). In this example, only the frames bound by selection window 378A may be presented as shown at 378B-C.

In some example embodiments, the video clipping based on selection windows may also take in to account position information and time as shown above with respect to FIGS. 3C and 3D. This video clipping based on geo-position and time ranges may enable the return a connected set of sequential time based images as shown at 376F, for example. To illustrate further, a user interface view may be generated that clips video(s) to within Main Street, so that a video player does not have to play through 10 minutes of video for example, to find Main Street.

The selection window may generate a query that filters out entire videos that are not within the selection window and/or each resulting video may be clipped to a specific a specific time range that satisfies the region bound by the selection window (and corresponding query).

Alternatively or additionally, instead of physically clipping a video, the operation may just return a set of time range markers or frame markers (which identify a portion of the video), such that the full video is provided to a player, but the player can automatically jump to the clipped portion. Referring to the Main Street example, the server may return an entire video but indicate to a player that the clipped portion corresponding to Main Street is at 3:02-4:06, so player can jump to 3:02 and play that portion. To illustrate further, the entire video 376D at FIG. 3C may be returned by a server to the user equipment, but playback back may automatically start playing at a time corresponding to the start of clip 376G.

The selection window, such as box 376A, may correspond to a GPS bounding box, a radius around a GPS point, and/or any other selection region. This may limit the play back of the video or clip the video to certain time(s) within the selection window. In some example embodiments, a video may be clipped so that only straight paths or routes are returned to, or presented at the user equipment. Alternatively or additionally, a video may be clipped so that it is stopped before the camera turns rapidly (which may result in a blurry video). Alternatively or additionally, a video may be clipped so that it only includes video where some type of turn maneuver is occurring. Alternatively or additionally, a video may be clipped based on the GPS trace speed (for example, only keep video when sections where the video GPS trace correspond to a speed faster than 30 miles per hour). Alternatively or additionally, a video may be clipped based on the path heading (for example, only keep video section where the video GPS trace is traveling north). Moreover, for each timestamp of a video, a video GPS point may be projected to a specific map link and position on the link. The map link identifier may be used to attach a video to a map database, and may be used to enable video query and clipping based on map attributes. Alternatively or additionally, a videos may be clipped (for example, filtered) based on height and other obstruction information. For example, a video may be clipped that is obstructed by a building. Alternatively or additionally, a video may be clipped based on road type (for example, only include residential roads, only include pedestrian routes, and the like).

Moreover, video playback attributes may be changed based on map association. For example, video playback speed may be varied based on a speed limit associated with a given street. When this is case, faster playback may be provided on highways when compared to slower residential street playback. Moreover, if the speed is beyond a threshold speed, video frames may be skipped.

Moving Videos Area Selection Tool

Figure 4A:
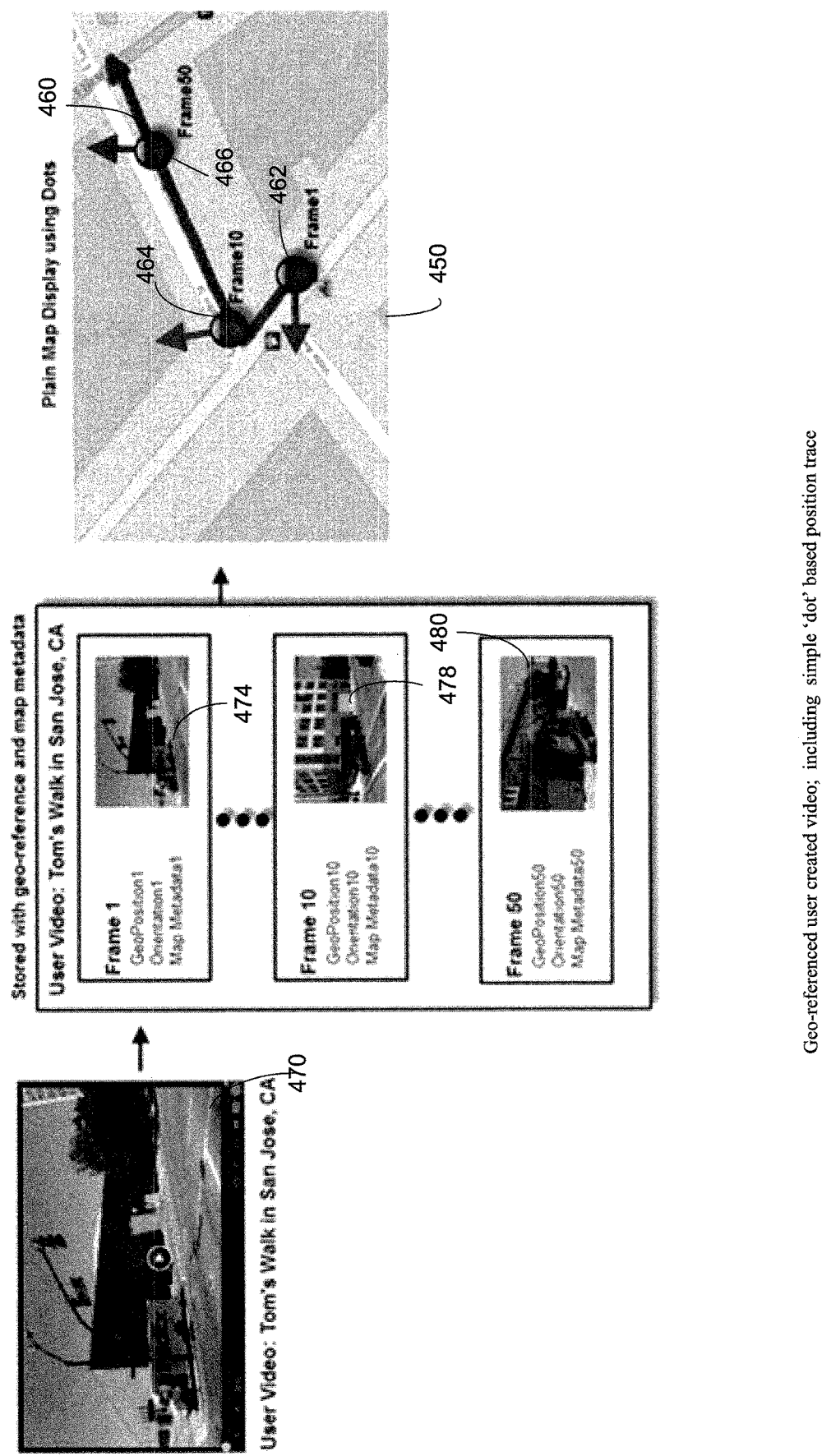
FIGS. 4A-4C depict examples of icons that can be used to indicate a video associated with a route, in accordance with some example embodiments.

FIG. 4A depicts an example of a user interface view 450 presented at a user interface of a user equipment, in accordance with some example embodiments.

The user interface view 450 may include a route represented by polyline 460. Along the route indicated by polyline 460, there may be one or more videos associated with the route. In the example of FIG. 4A, the route includes 3 videos represented by 462, 464, and 466. For example, video selection icon 462 may be associated with a first video (or one or more frames of a video) for the route. Moreover, the video selection icon 464 may correspond to a second video at the location where video selection icon 464 is located, while video selection icon 466 may correspond to a third video at the location where video selection icon 466 is located.

Moreover, the video selection icons 462-466 may also include a graphical indication of the orientation of the source video camera taking the video, in accordance with some example embodiments. For example, selection icons 462-466 may include an arrow to depict an orientation of the camera that recorded the corresponding video.

When video selection icon 462 is selected, a video (or portion thereof) may be played for the location where icon 462 is located on the route. In this example, the video selection icon 462 may present frame(s) 470, which may be stored at a server including navigation/mapping data. Moreover, the icon 462 may include a graphically distinct element, such as arrow 463, to indicate the camera orientation to the scene recorded in the video. The frame, orientation, and other map metadata may be stored, as shown at 474, in a server, such as a navigation server or associated image or video server, to enable queries and subsequent presentation. FIG. 4A also shows the frame(s) 478 associated with icon 464, and frame(s) 480 associated with icon 466. FIG. 4A thus depicts an example of how geo-referenced user videos may be presented at a user interface as moving video displays on map, such as a 2D or 3D map. The icons 462-466 may graphically indicate both the position of the video (or frame(s) thereof) and orientation of the video (or frame(s) thereof) along a route.

Figure 4B:
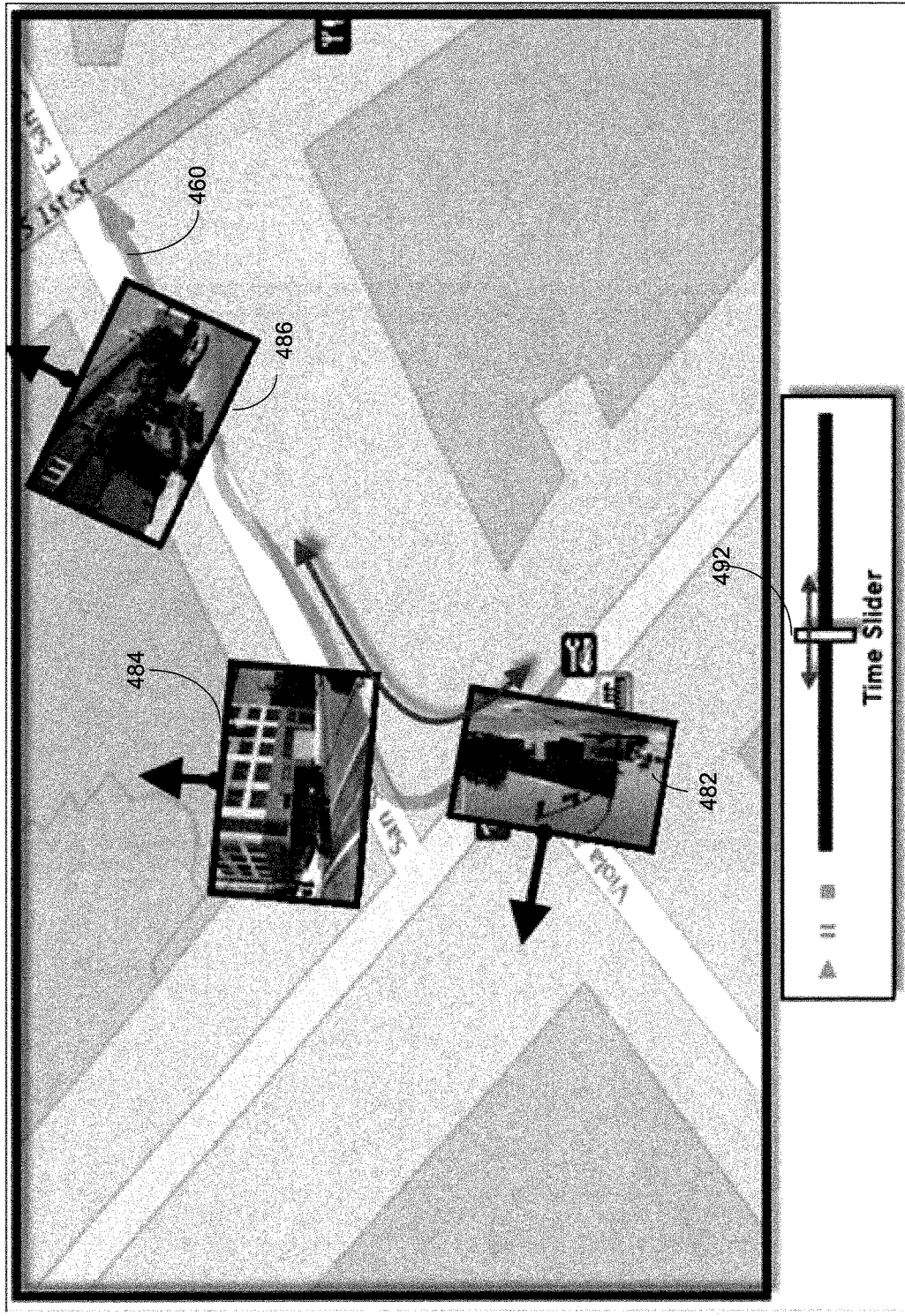

FIG. 4B depicts is similar to FIG. 4A in some respects but includes thumbnails 482-486 of video rather than a dot as shown at 462-486, in accordance with some example embodiments. In some example embodiments, selection may be temporal, via slider 492, and/or spatial via selection of the thumbnails along route 460. The orientation of the video may vary as shown based on the orientation of the camera.

Figure 4C:
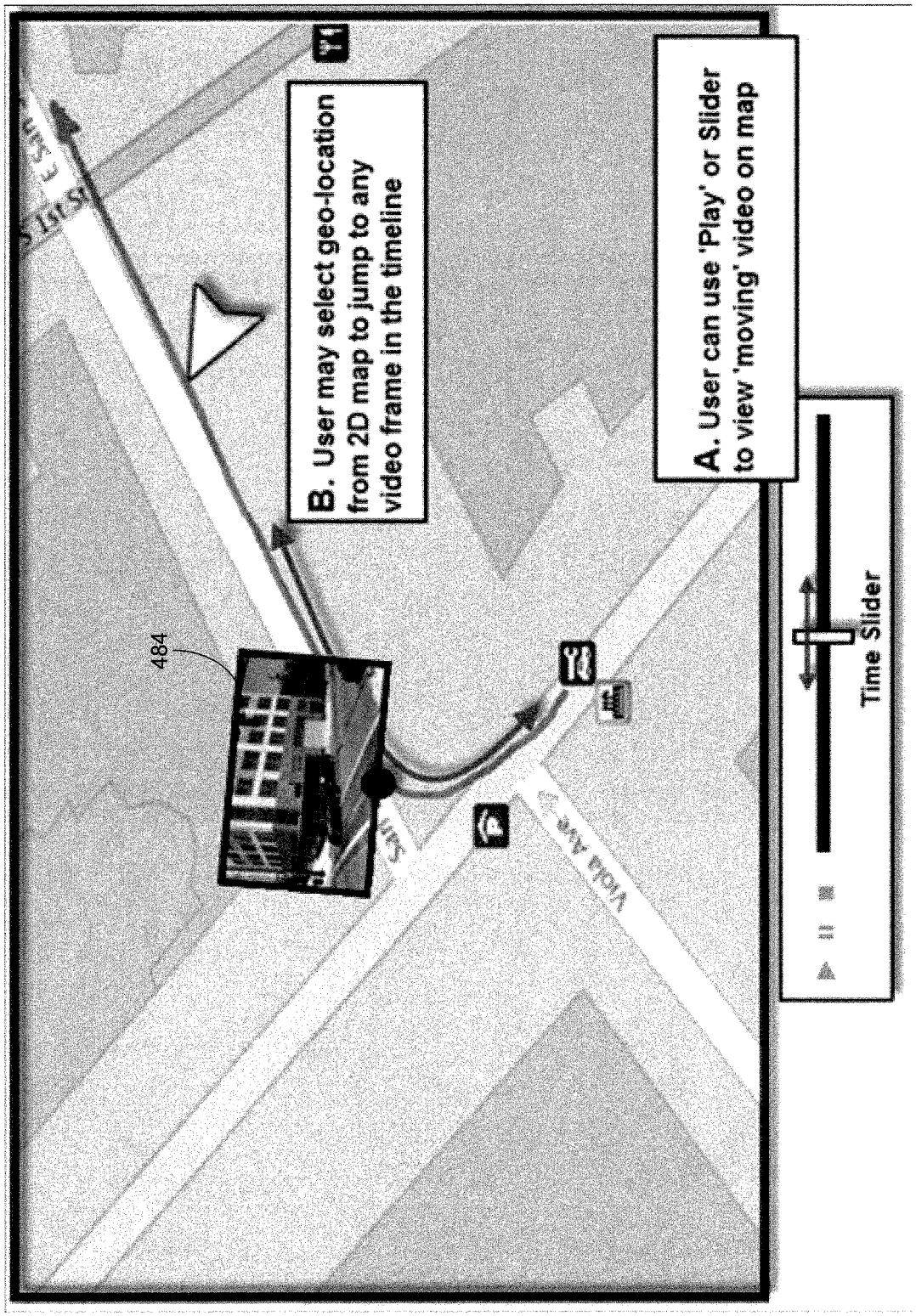

FIG. 4C depicts selection of thumbnail 484 via time slider 492 and/or spatial selection, in accordance with some example embodiments. For example, moving time slider may sequence in time through the route and corresponding video. Here, the slider position results in the selection of thumbnail 484, although thumbnail 484 may also be selected by clicking (or otherwise selecting by clicking 484). Alternatively or additionally, thumbnail 484 may be selected, and then slider 494 may be used to traverse in time through the video segment associated with thumbnail 484.

Figure 5:
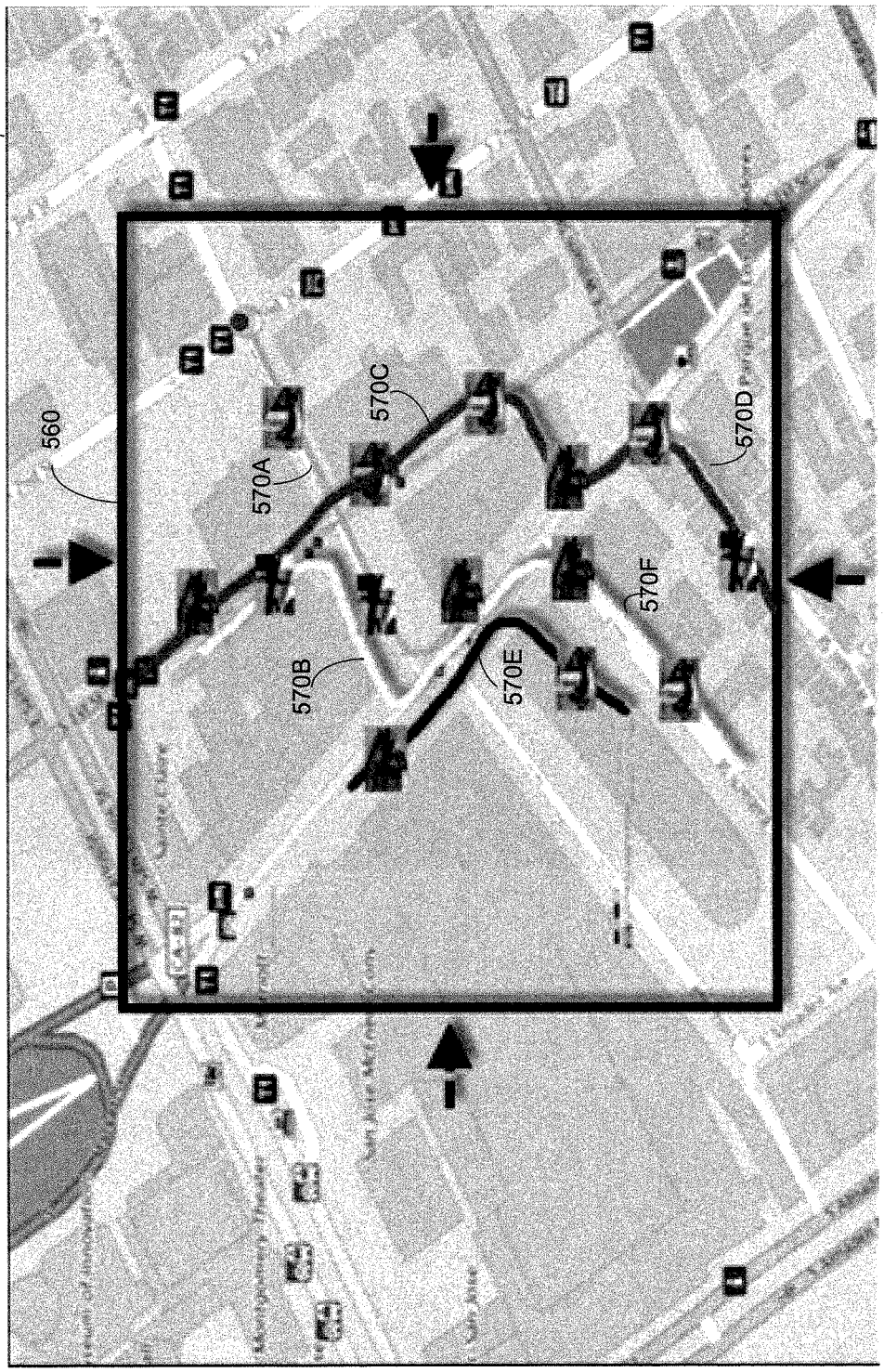
FIG. 5 depicts an example of video search, in accordance with some example embodiments.

FIG. 5 depicts an example of video search, in accordance with some example embodiments. To locate videos, a map, such as 2D map display 550 presented at a user interface of a user equipment, may be used to zoom into a spatial region 560. The videos geo-referenced, or indexed, to the region 560 of the map may be displayed as animated video along their corresponding routes, such as routes 570A-F. The user may select a specific video thumbnail to open the full video display.

Moreover, the video clipping of FIG. 5 may also take in to account time ranges, speed, and/or location to generate a query that returns for example a connected set of sequential time based video sequence. In addition, map-matched data associated with the video geo-position, and/or from map data previously embedded into the video may be used to further filter the query results. For example, the query may specify provide a video of Main Street, and the query would return only a portion of the video associated with Main Street or the entire video (but include metadata indicating where the Main Street portion is located in the video). The returned video may filters portions of the video that are not relevant, so the returned video represent a clip bound by for example the geographic bounding region 560 (although speed and time may also be used as well to filter the video(s)).

In another example embodiment, the associated map data may be used to spatially filter results to within a specific map boundary, such as a city or neighborhood boundary. In some other example embodiments, video might be clipped based on a specific building's footprint, or within 100 meter (m) of a building or point of interest (POI).

In another example embodiment, 3D map data may be used to select and clip video. Suppose for example it is desired to return spatially clipped videos for a 100 meter area around a user's current location within a city. However, the user in this example only wants to see videos of the part of the city that the user can currently view. The user in this example does not want to see videos that are for example around the corner or behind buildings. In this example, the 3D building models from the map might be used to filter any video sections that are not visible from their current location. Likewise, if videos are requested for region around a specific journey view bubble (1$^{st}$ person viewpoint along a road), they likely do not want video sections that disappear behind trees or buildings. As such, depth images that are associated with the journey view bubble can further filter video regions that are only visible from the bubble viewpoint. The bubble depth map, the bubble geo-locations, and the bubble original may be used to compute the geo-location of each image pixel. Each of the potential video geo-locations may be checked against the image pixel locations. If the video geo-location is further away from the view center than the image pixel geo-locations, then those video sections may be removed from the query result.

To illustrate further, the query may identify a portion of the video at a certain location, route, or bounding region. The query may also specify a time (or time period). Moreover, speed may also be specified in the query. For example, the query may search for portions of video within bounding box 560, occurring at midnight, traveling North, and recorded at a speed of 75 miles per hour. In this example, the query may return for presentation a portion of a video associated with polyline 570C that satisfies those query parameters. As such, the user equipment may then present the specific portion(s) occurring within bounding box 560, occurring at midnight, traveling North, and recorded at a speed of 75 miles per hour. In some example embodiments, a query may return only videos on specific map related attributes, such as only videos captured while on pedestrian paths, or only videos that pass in front of a specific storefront, building, or address.

In another example, the spatially clipped videos might define a maximum and/or minimum duration. For example, if a large location is queried, it might be desirable to only include 30 seconds of the video portion that is closest to the center of the queried region. Likewise, if a video has only one frame that falls within the query, a minimum of +/−5 seconds around the frame might be included.

Figure 6A:
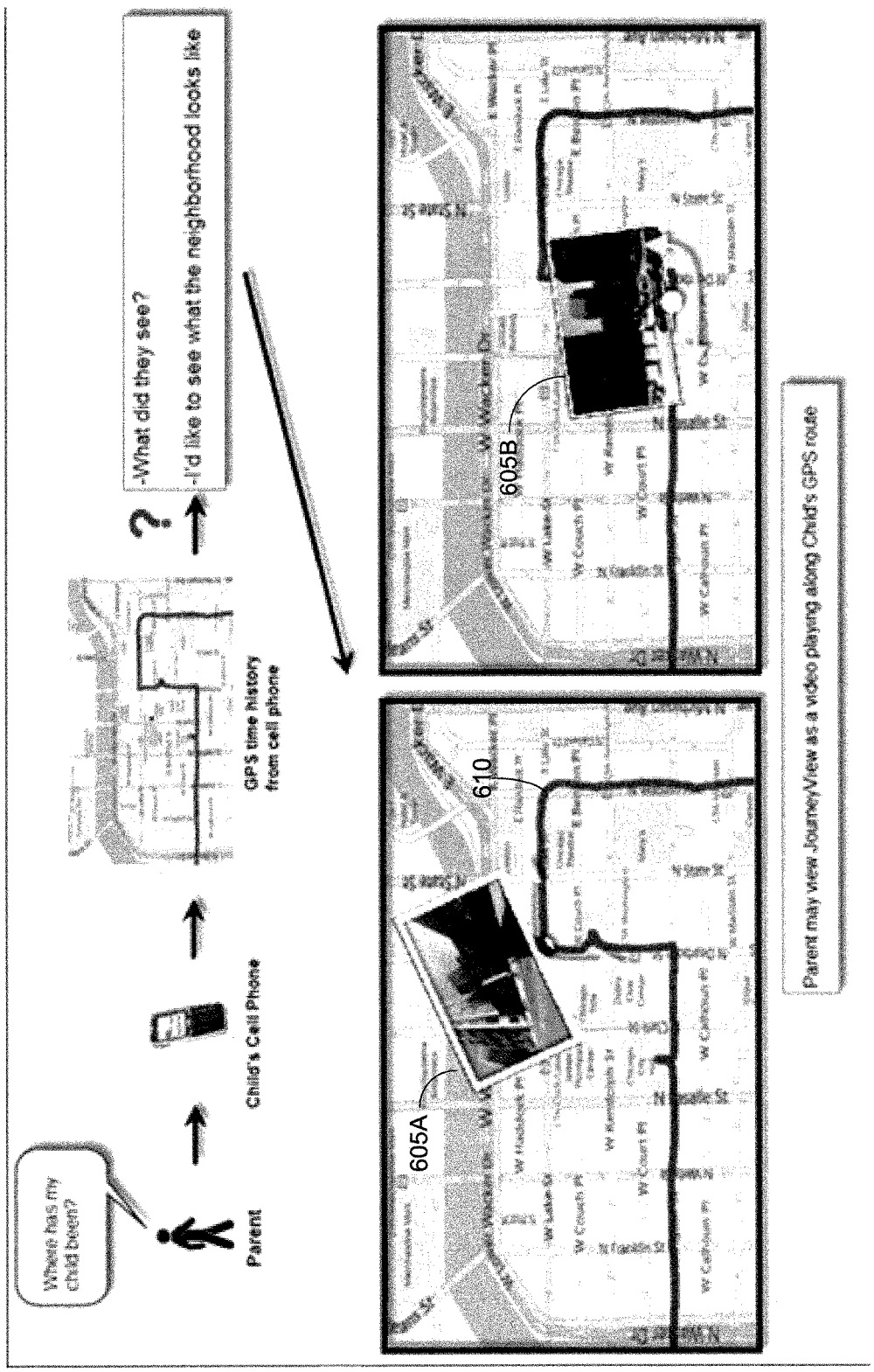
FIGS. 6A-6B depict examples views providing videos for a route, in accordance with some example embodiments.

FIG. 6A depicts videos that may be shown in journey view bubbles (street level imagery). When a user views a street-level image, videos that are geo-referenced to the geo-location, road link, or point of interest may be displayed as moving images in the bubble view (for example, the journey view images can provide a backdrop for the geo-referenced user videos). In some example embodiments, GPS traces 610 (without video) may be displayed as shown. However, a server may provide video frames to provide a so-called journey view along the route. The journey view may provide a video from the perspective of for example a person walking, biking, or driving the route. The journey view may also include different orientations, so that views of the area surrounding the route may also be viewed at each location along the GPS trace. For each geo-location and orientation, the user equipment may send a request to a server for a journey view image that is on, or near, the requested geolocation. In response, a portion of the video or image may be extracted based on the desired orientation. The orientation may be defined by the user provided trace, or by computing an offset direction from the journey view image to the indicated geo-location.

In the FIG. 6A example, a user, such as a parent, may be viewing at a live GPS trace 610 of their child's current phone location. Instead of just a dot on the map, the parent is presented with a video display on the map. And, this video may display a street level view where their child is currently located as well as where the child has been. As the child moves in this example, the video thumbnail is updates as shown as the child moves from 605A to 605B.

Figure 6B:
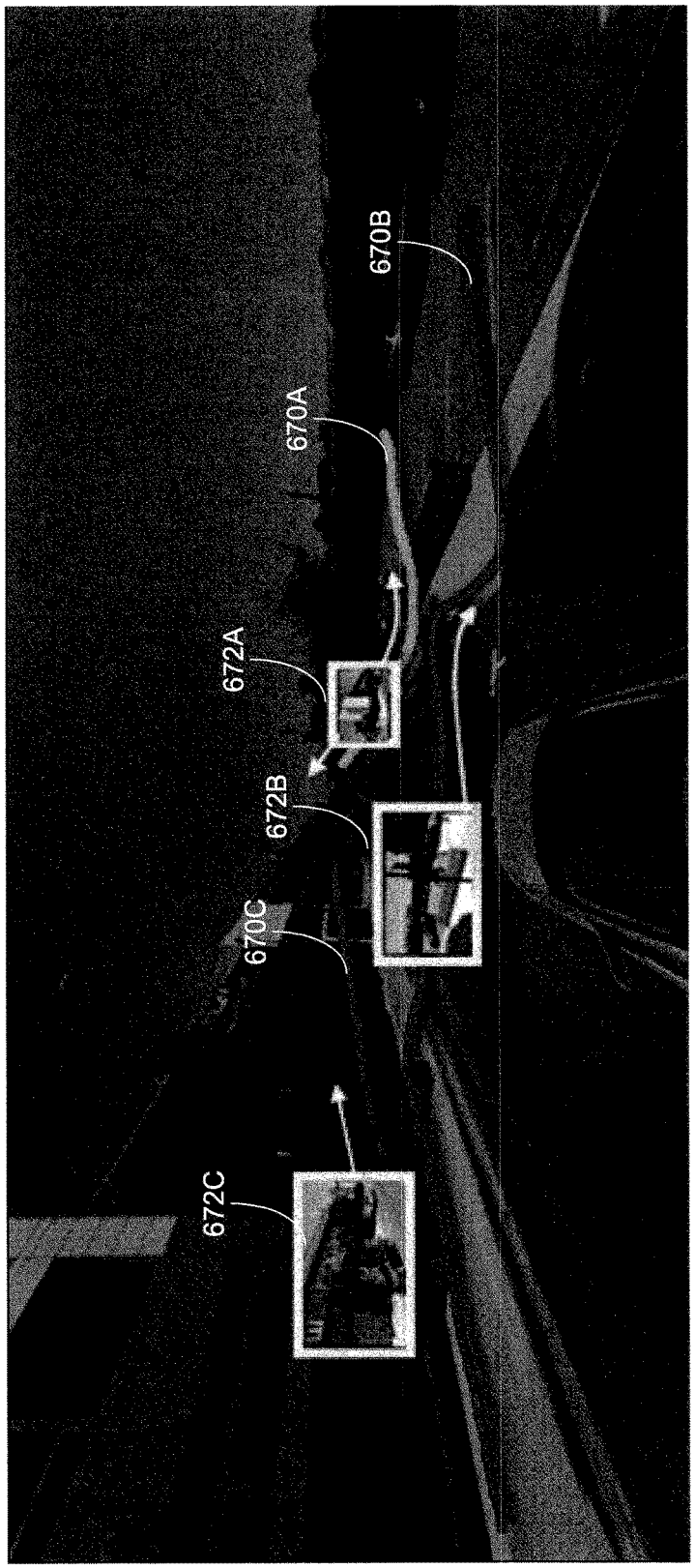

FIG. 6B depicts another journey view video, in accordance with some example embodiments. In the example of FIG. 6B, the GPS route traces, such as polylines 670A-C, may be presented as a user interface view including icons 672A-C. Each of the icons 672A-C may include a graphical indication of the orientation of the video. For example, icon 672C includes a video with an orientation along the direction of travel associated with polyline 672C. As such, selection of icon 672C may provide a video view of the journey along the route associated with polyline 672C. In the example depicted at FIG. 6B, the playback of three videos is presented moving along their captured GPS traces, as seen from the perspective of the journey view image. Instead of showing videos on a top-down map, they are presented here as a 1$^{st}$ person viewpoint at road level. This view includes geo-location origin, an orientation, and perspective, such that the GPS traces are displayed in a spatially correct 3D environment. For example, the video images may become smaller as they move further away from the journey view's origin. In some example embodiments, a pedestrian captured video (672C) may appear as a moving video that travels along the sidewalk of the journey view image.

Figure 7:
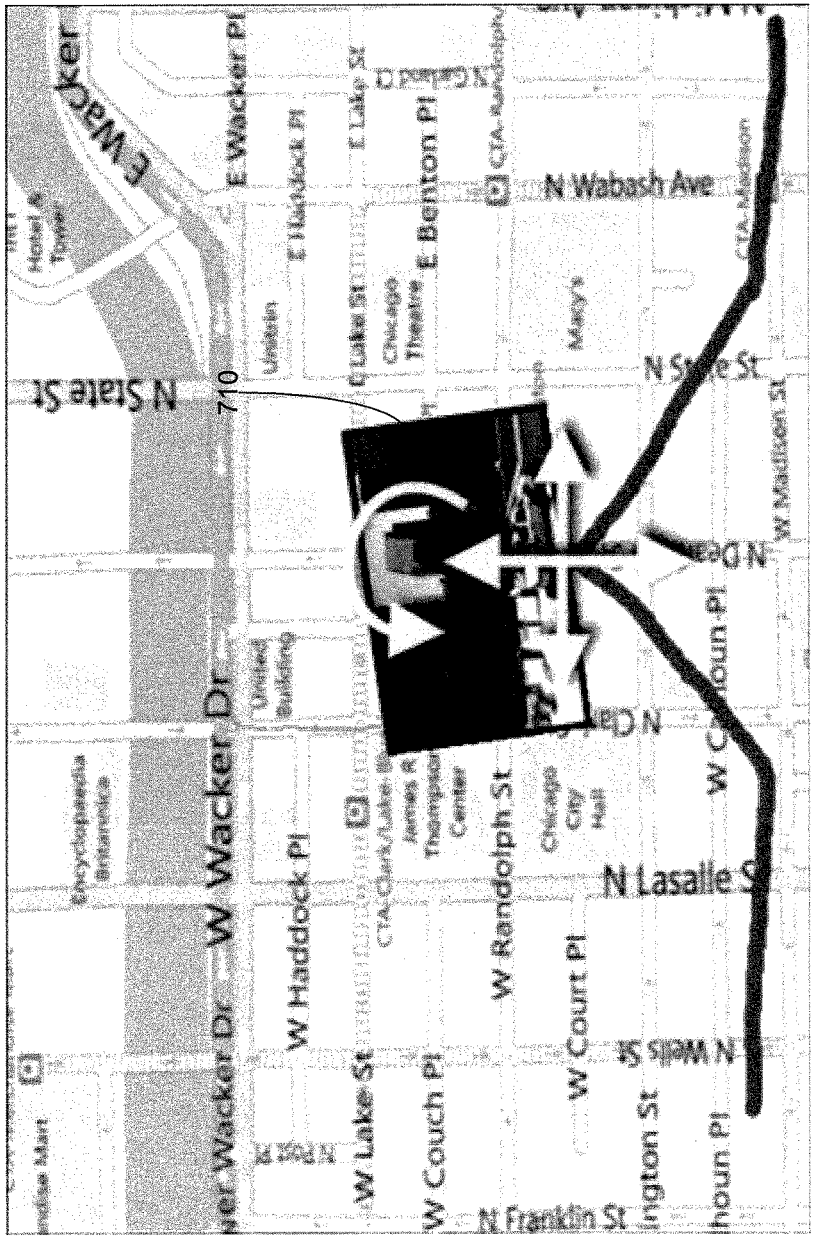
FIG. 7 depicts an example of video editing, in accordance with some example embodiments.

FIG. 7 depicts video editing, in accordance with some example embodiments. For example, editing including adding geo-location to non-geo-referenced videos (or for example, where GPS is not available such as within certain structures including some indoor malls) may be performed using a map display. In the example of FIG. 7, a user may drop each video frame 710 on the map to add geo-referencing to the video frame. Likewise, they may slide, or rotate the video frame on the map to edit existing video geo-reference data.

In some example embodiments, a user may and or edit road database attributes to each frame, such as road links, points of interest, or building. Custom, user defined attributes or comments may also be added to each frame which has a geo-location. When replaying the video, these custom attributes are shown on the map at the stored geo-location from the video.

In some example embodiments, the video geo-position may be stabilized by map-matching the GPS positions onto a map database, such that the position might be snapped onto the road or pedestrian links.

In some example embodiments, the playback rate of clipped/queried video may be based on: speed of travel when the video was captured, posted speed from the map database, curviness of the captured path, an urban/rural region, and/or the like. For example, if the video is along a straight section of road traveling 100 miles per hour, the video might be automatically played back at a higher rate. Alternatively or additionally, a video captured on a curvy, pedestrian path might be played back at a slow rate since more details are likely captured in the video. Moreover, video frames may be skipped to shorten the video duration. For example, a long straight section of road is selected for 1 mile. In this example, only every $\frac{1}{10}^{th}$ frame might be displayed on playback.

In some examples embodiments, the clipped videos for a region might be displayed as one or more stationary video inset frames. In some examples embodiments, the videos may be displayed as a moving frame that travels along the video traces and are overlaid onto a map.

In some examples embodiments, video delivered to the user may be clipped files; in other examples, the user may be presented with the full video file, but with the video auto-advanced to the starting region of the clipped time range along with auto start and stop markers for the time range.

The following provides an example navigation system in which the subject matter described herein may be implemented, although other systems may be realized as well.

Figure 8:
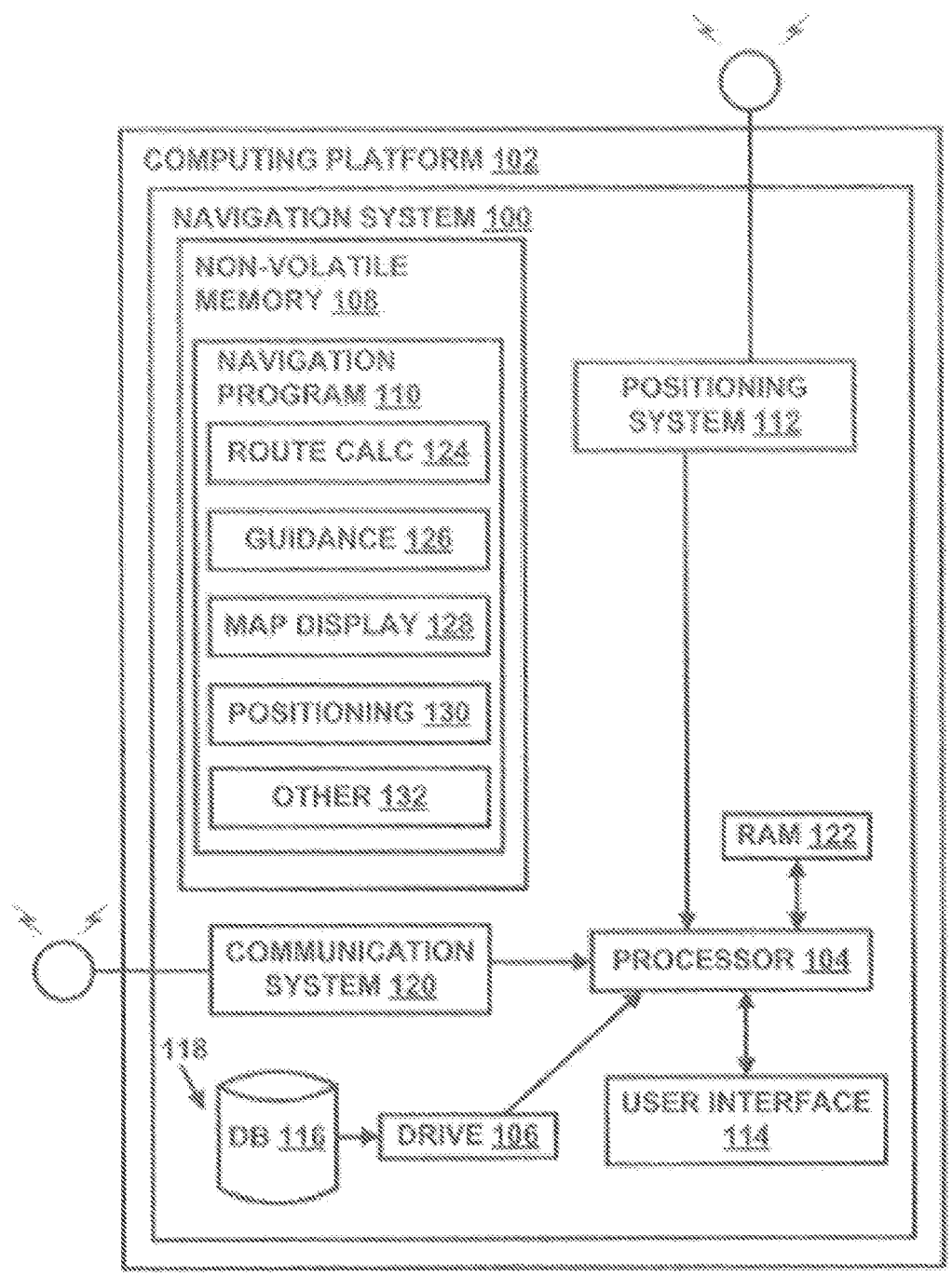
FIG. 8 depicts an example of a navigation system, in accordance with some example embodiments.

FIG. 8 depicts an example of a system 800 providing at least a navigation system 100, in accordance with some example embodiments. The system 800 may comprise at least one computing platform 102, such as a user equipment (for example, a smartphone, a mobile phone, a tablet, a personal navigation device, a smart watch, and/or a vehicular navigation system) and/or any computer or processor-based device. Moreover, system 800 may include a processor 104, a drive 106 coupled to processor 104, and a memory 108, such as non-volatile memory (although volatile memory may be used as well) for storing navigation application software program 110 and/or other information.

System 800 may also include a positioning system 112. Positioning system 112 may utilize GPS-type technology, a dead reckoning-type system, or combinations of these or other systems. The positioning system 112 may further include sensing devices that measure the traveling distance speed, direction, orientation and so on. The positioning system 112 may also include a GPS system and/or the like. The positioning system 112 may provide output signals to processor 104. Navigation application software programs 110 may use the output signal from the positioning system 112 to determine the location, direction, orientation, etc., of the computing platform 102.

System 800 may include a user interface 114 to enable an end user for example to input information into system 800 and obtain information from the system 800. This input information may include a request for navigation features and functions of navigation system 800. Moreover, information from system 800 can be displayed on a screen of user interface 114. The screen may also display velocity based polylines, route videos, synchronized videos, selection windows/tools, and/or the like as disclosed herein. To provide navigation features and functions, system 800 may access a geographic database 116 stored on a storage medium 118. Storage medium 118 may be installed in drive 106 so that the geographic database 116 can be read and used by the system 800, although other forms of storage including non-volatile and/or volatile memory may be used as well.

Geographic database 116 may be a geographic database published by HERE North America, LLC of Chicago, Ill., although other types of geographic databases may be used as well. Storage medium 118 and geographic database 116 do not have to be physically provided at the location of the system 800. Alternatively or additionally, storage medium 118, upon which some or the entire geographic database 116 is stored, may be located remotely (for example, at a web-accessible server) from the rest of the system 800 and portions of the geographic data may be provided via a communications system 120, as needed.

Navigation application software program 110 may load from storage 108 into a random access memory (RAM) 122 associated with processor 104. The processor 104 may also receive input from user interface 114. System 800 may access geographic database 116 stored at storage medium 118 (which may be in conjunction with the outputs from the positioning system 112 and the communications system 120) to provide various navigation features and functions. The navigation application software program 110 may include separate applications (or subprograms) that may provide various navigation-related features and functions. For example, navigation functions and features may include route calculation 124 (wherein a route from an origin to a destination is determined), route guidance 126 (wherein detailed directions are provided for reaching a desired destination), map display 128, and positioning 130 (e.g., map matching). Other functions and programming 132 may be included in the navigation system 800 including people and business finding services (e.g., electronic yellow and white pages), point of interest searching, destination selection, location based services, location base advertising services, velocity based polylines, route videos, synchronized videos, selection windows/tools, and/or the like as disclosed herein. Alternatively or additionally, system 800 may include one or more local components (for example, located physically with an end user) accessing one or more remote components. For example, a navigation services server may be implemented as a remote component. In this example, navigation application software programs 110 and geographic database 116 may reside with the navigation server.

Figure 9:
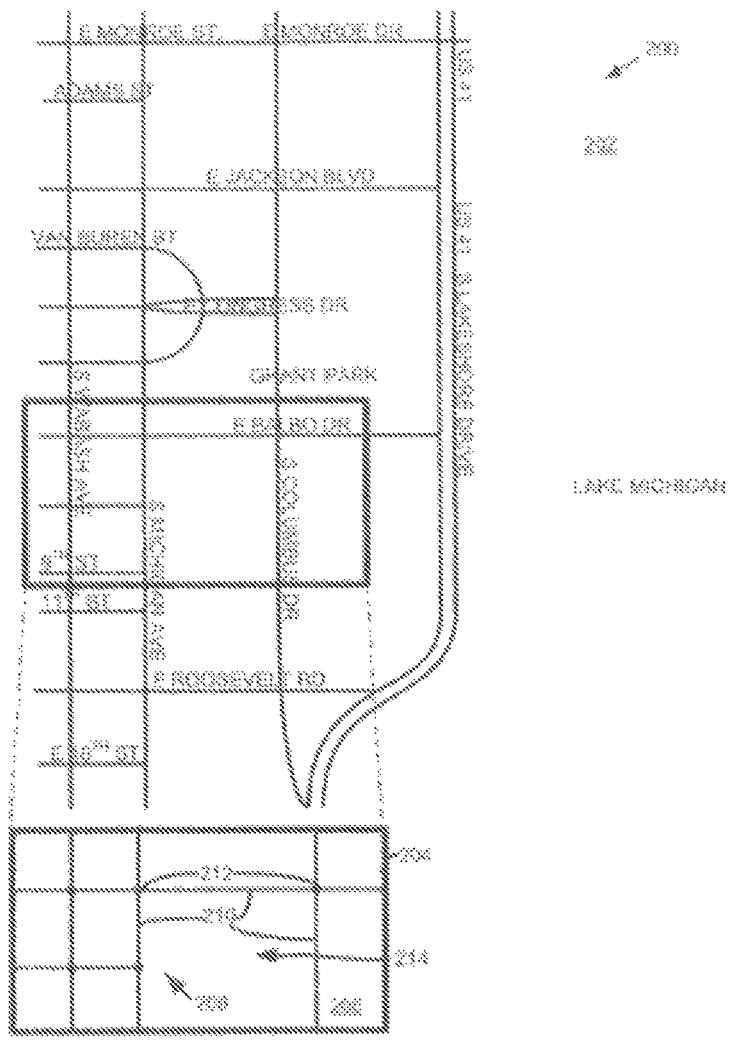
FIG. 9 depicts an example of a map, in accordance with some example embodiments.

To provide navigation-related features and functions to an end user, system 100 may access geographic database 116 which may include information about one or more geographic regions. FIG. 9 illustrates an example of a map 200 of a geographic region 202. The geographic region 202 may correspond to a metropolitan or rural area, a state, a country, or combinations thereof, or any other area. Located in the geographic region 202 may be physical geographic features, such as roads, points of interest (including businesses, municipal facilities, etc.), lakes, rivers, railroads, municipalities, etc. FIG. 9 may also include an enlarged map 204 of a portion 206 of the geographic region 202. In this example, enlarged map 204 illustrates part of a road network 208 in the geographic region 202. The road network 208 may include for example roads and intersections and the like located in the geographic region 202. As shown in portion 206, each road in geographic region 202 may be composed of one or more road segments 210. The road segment 210 may represent a portion of the road. In the example of FIG. 9, each road segment 210 may have two associated nodes 212 (for example, one node represents the point at one end of the road segment and the other node represents the point at the other end of the road segment). The node 212 at either end of a road segment 210 may correspond to a location at which the road meets another road (for example, an intersection, or where the road dead-ends). Moreover, portion 206 may also include paths or a path network (not shown) that may be traversed by pedestrians, such as in a park or plaza. As noted, the map may also velocity based polylines, route videos, synchronized videos, selection windows/tools, and/or the like as disclosed herein.

Figure 10:
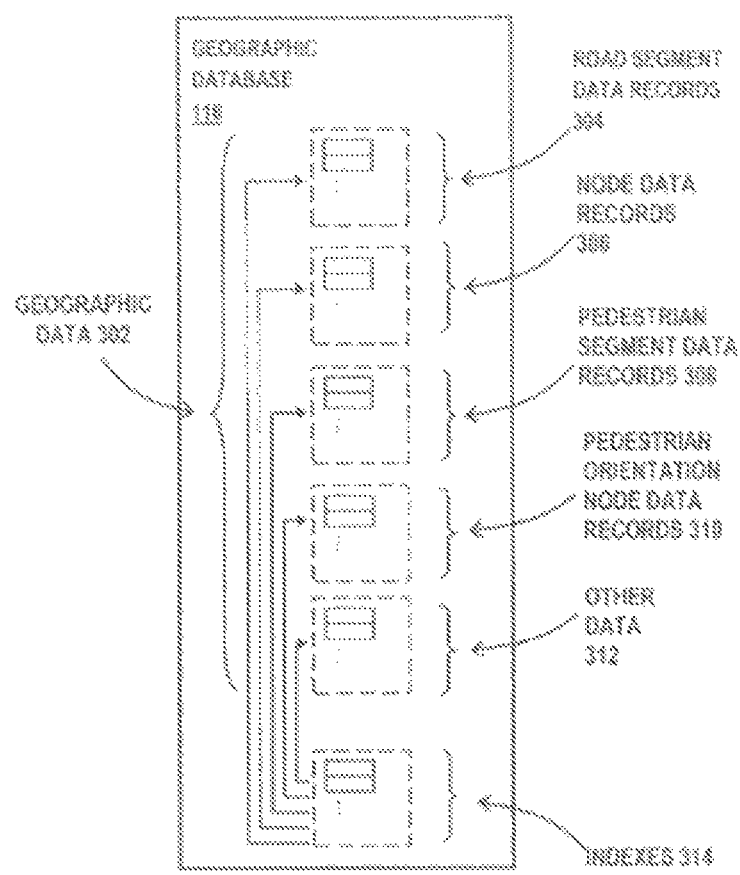
FIG. 10 depicts an example of a geographic database, in accordance with some example embodiments.

FIG. 10 depicts an example implementation of geographic database 116. Geographic database 116 may include data 302 that represents some of the physical geographic features in the geographic region 202 depicted in FIG. 10. The data 302 may include data that represent road network 208. Moreover, geographic database 116 (which represents the geographic region 202) may include at least one road segment database record 304 (also referred to as "entity" or "entry") for each road segment 210 in the geographic region 202. The geographic database 116 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts. Geographic database 116 may also include at least one pedestrian segment database record 308 for each pedestrian segment in the geographic region 202 and orientation node database record 310 for each orientation node in the geographic region 202. Pedestrian segments and orientation nodes are associated with paths that may be traversed by pedestrians, such as in the park or plaza. Although a pedestrian segment is depicted, other types of segments may also be included such as a driving segment, a train segment, a bus segment, a biking segment, and/or the like.

Geographic database 116 may also include, or be linked to, other kinds of data 312, such as videos of routes as disclosed herein. The other kinds of data 312 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 116 also includes indexes 314. The indexes 314 may include various types of indexes that relate the different types of data to each other or that relate to other aspects of the data contained in the geographic database 116. For example, the indexes 314 may relate the nodes in the node data records 306 with the end points of a road segment in the road segment data records 304. As another example, the indexes 314 may relate point of interest data in the other data records 312 with a road segment in the segment data records 304.

Figure 11:
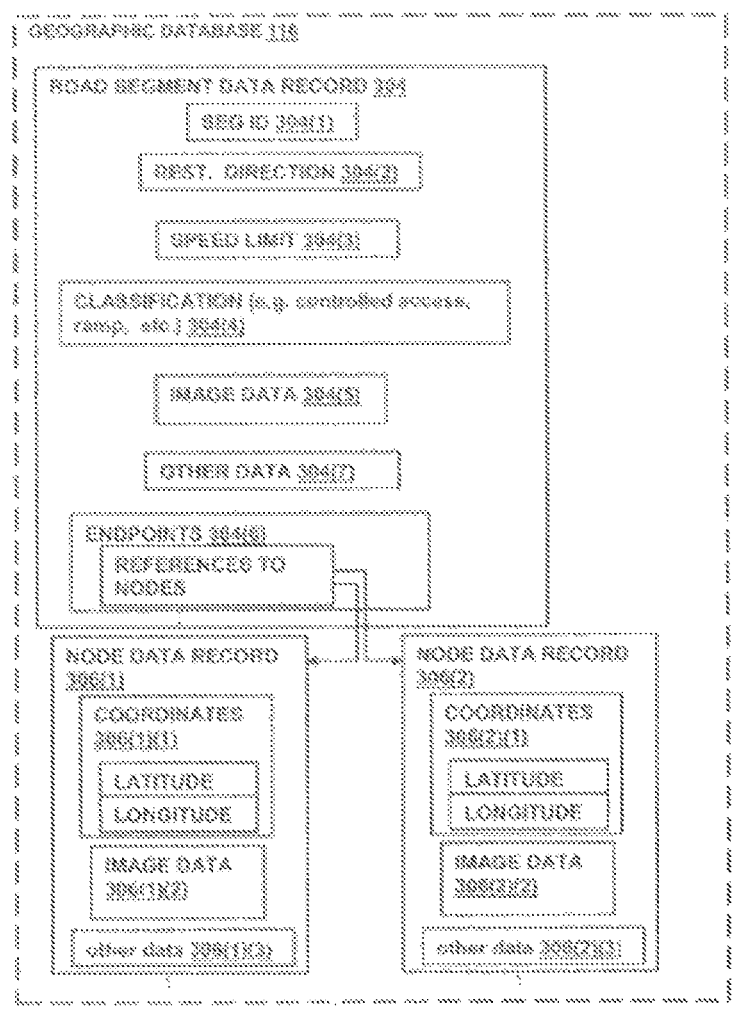
FIG. 11 depicts some examples of components of a road segment data record which may be stored in the geographic database 116, in accordance with some example embodiments.

FIG. 11 shows some of the components of a road segment data record 304 contained in the geographic database 116, in accordance with some example embodiments. The road segment data record 304 includes a segment ID 304(1) by which the data record can be identified in the geographic database 116. Each road segment data record 304 has associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 includes data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on. The road segment data record 304 also includes data 304(6) providing the geographic coordinates (e.g., the latitude and longitude) of the end points of the represented road segment. In some embodiments, the data 304(6) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record that cross-references to each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 11 also shows some of the components of a node data record 306 contained in the geographic database 116. Each of the node data records 306 may have associated information (such as "attributes", "fields", etc.) that allows identification of the road segment(s) that connect to it and/or it's geographic position (e.g., its latitude and longitude coordinates). For the embodiment shown in FIG. 11, the node data records 306(1) and 306(2) include the latitude and longitude coordinates 306(1)(1) and 306(2)(1) for their node. The node data records 306(1) and 306(2) may also include other data 306(1)(1)-306(1)(3) and 306(2)(1)-306(2)(3) that refer to various other attributes of the nodes. This other data may include images, route videos along a given route, and/or metadata associated with the route videos.

Figure 12:
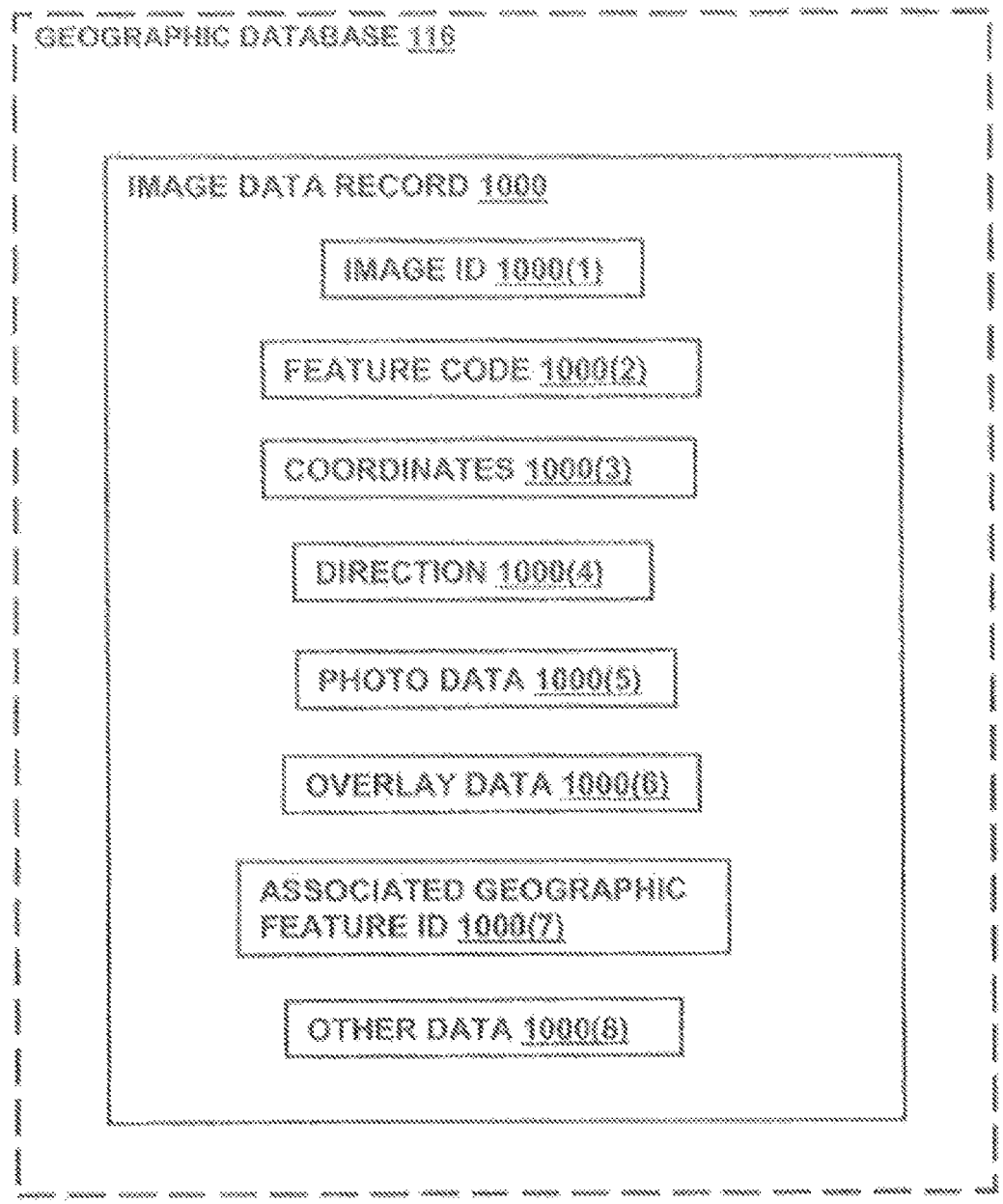
FIG. 12 depicts an example of an image and/or video data record which may be stored in the geographic database 116, in accordance with some example embodiments.

FIG. 12 depicts an example of image (such as a video, for example) data record 1000 which may be stored at geographic database 116. The image data record 1000 may include an image ID 1000(1) by which the data record for the image or videos to be identified in the geographic database 116. Each image data record 1000 may have associated with it information (such as "attributes", "fields", etc.) that describes features of the represented image/video. The image data record 1000 may include data 1000(2) or a feature code that indicates a type of geographic feature captured in the respective image/video, such as a road segment, road intersection, pedestrian segment, orientation node, point of interest, scenic view or any geographic feature of the geographic region. The image data record 1000 may include data 1000(3) that indicate a location associated with the image/video, such as the longitude and latitude coordinates of the location. The image data record 1000 may also include data 1000(4) that indicates a direction/orientation associated with the image/video, such as a direction associated with a control point in the image. The data may also include time stamps to enable velocity based polyline generation and/or speed information to enable velocity based polyline generation.

Image data record 1000 may further include data 1000(5) enabling the image or video to be displayed. Image data record 1000 may also include overlay data 1000(6) providing data to allow the navigation system 100 to create guidance information overlays on the image, such as polylines and the like. In some example embodiments, the overlay data 1000(6) may identify overlay pixels corresponding to guide points and label points of the image. Overlay data 1000(6) may identity the overlay pixels that correspond to geographic features, such as road segments, pedestrian segments, nodes and orientation nodes to allow route highlights and maneuver arrows to be overlaid on the image/video at locations corresponding to the geographic features. Furthermore, the overlay data 1000(6) may identify overlay pixels corresponding to points of interest or other items in the image suitable for guidance information overlays, such as text, advertising and icons. The overlay data 1000(6) may also indicate the style and information included in the guidance information overlay. By identifying the pixels in the image/video, guidance information overlays may be created dynamically by the system 100, which may avoid having to store multiple copies of the same image. For example, the overlay may be an arrow pointing to a direction to movement. As another example, the overlay may be a route highlight comprising series of dots for the user of the system 100 to follow. Any other overlay may be used, such as labels and direction indications. In an alternative embodiment, the overlay data 1000(6) may contain a plurality of established guidance information overlays, such as route highlights or maneuver arrows associated with road segments or pedestrian segments.

The image data record 1000 may also include data 1000(7) indicating a geographic feature ID or several geographic features associated with the image/video. The image/video may be cross-referenced with the geographic feature(s). The associated geographic feature ID data may be a road segment ID, node ID, pedestrian segment ID, orientation node ID, point of interest ID or a reference to any other geographic feature of the geographic database 116. The image data record 1000 may also include other data 1000(8). Image data record 1000 may also include data providing a vector data clip corresponding to the photo or video data 1000(5).

In some example embodiments, one or more processed or generated video views from the data collected may be stored in a separate video (or image) database. This view data may include video data files or image data files that correspond to composite or stitched images/videos that represent panoramic image/video views. Alternatively, raw, preprocessed, and/or other image/video data may be stored in the image database. Also, links, IDs, or data associations that associate map data or map representations or depth maps with specific image/video views may be part of the view data, may be stored in indexes, or may be stored somewhere else, such as in the geographic database 116 or other database. The indexes may be one or more look-up tables, organization charts, links or association files or IDs, and/or any index data files that associates different data or data files. The data representing identified road surface or path surface may be stored in the image/video database or linked to view data to allow route highlights to be placed over the road surface or path surface shown in the image view.

In some example embodiments, navigation system 100 (or portions thereof) may be included in an end user device, such as a user equipment. The user equipment may be an in-vehicle navigation system, a personal navigation device (PND), a portable navigation device, a cellular telephone, a mobile phone, a personal digital assistant (PDA), a smart phone, a watch, a camera, a computer, and/or other device that can perform navigation-related functions, such as digital routing and map display. In some example embodiments, the user equipment may thus provide navigation and map functions such as guidance and map display, for example, and for determination of one or more personalized routes or route segments based on one or more calculated and recorded routes as well as route videos and the like as disclosed herein.

Figure 13:
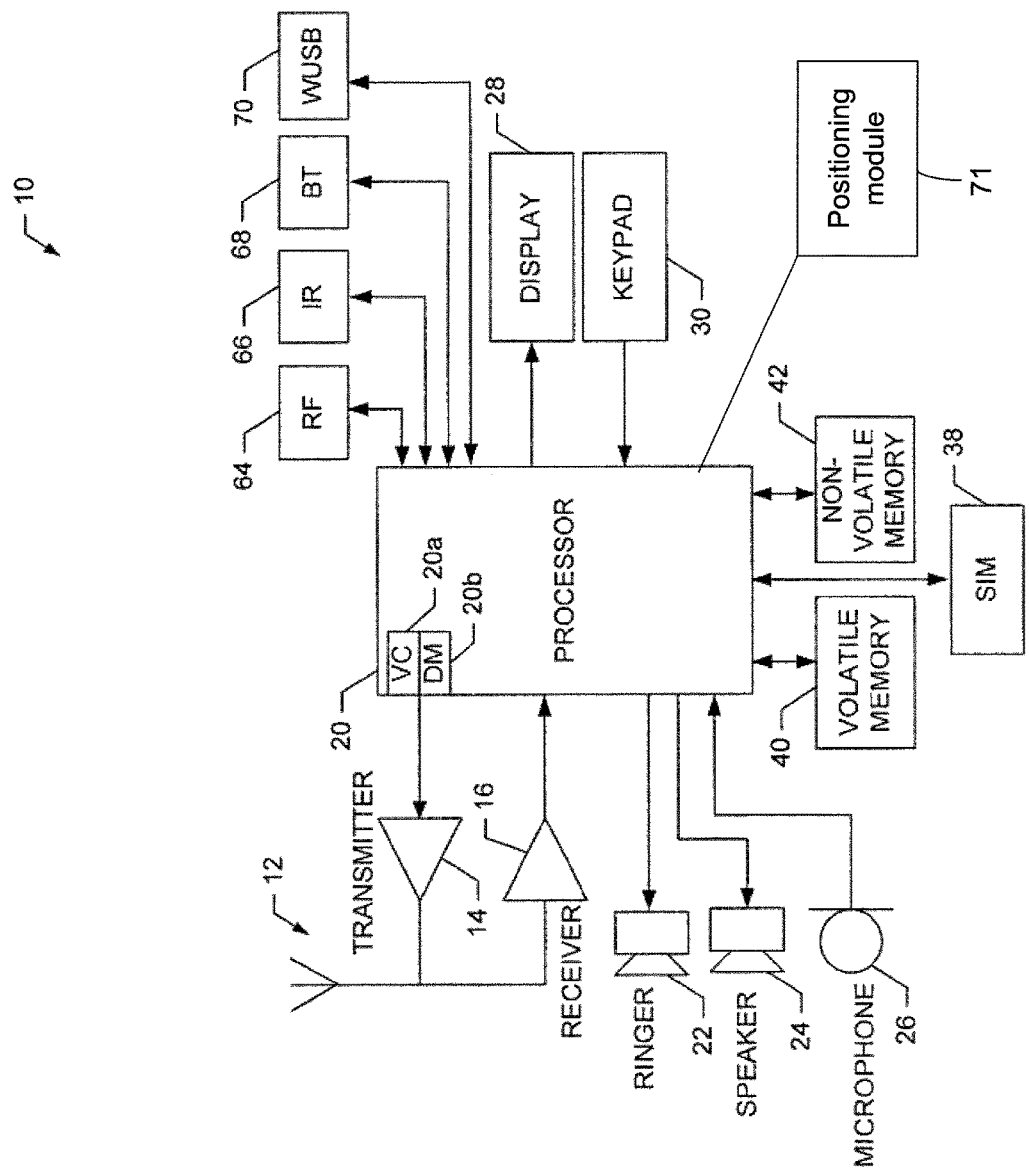
FIG. 13 depicts an example of an apparatus, in accordance with some example embodiments.

FIG. 13 depicts a block diagram of an apparatus 10, such as a user equipment, in accordance with some example embodiments. The user equipment may include a user interface to provide maps, routes for navigation, route videos, velocity based polylines, synchronized route videos, selection windows/tools, and/or the like as disclosed herein. Moreover, the user equipment may couple to other servers including navigation system servers which may be linked to, include, geographic database(s), route video servers, and/or the like.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 13 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or any subsequent revisions or improvements to these standards. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, LTE-Direct, LTE-Unlicensed, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. For example, the PND may provide voice commands to enable voice-guided navigation. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 13, apparatus 10 may also include one or more mechanisms for sharing and/or obtaining data. Moreover, apparatus 10 may also include, or be coupled to, a positioning module 71, such as a global navigation satellite system (GNSS) receiver, such as GPS and the like for example, in order to provide positioning information to the apparatus. The apparatus 10 may also include for example short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus to provide the operations disclosed herein including the processes at FIG. 1B and/or the like. The memories may comprise an identifier, such as an international mobile equipment identification (IMEI) code, capable of uniquely identifying apparatus 10. The functions may include the operations disclosed herein including the following: generating, by a user equipment, a user interface view including a map and a polyline representative of a route along the map; generating, by the user equipment, the polyline to include at least one graphically distinct indicator along the route, wherein the at least one graphically distinct indicator, when selected at the user interface, initiates presentation of a video recorded at a location on the route where the at least one graphically distinct indicator is located; generating a selection window on a user interface view presenting map data and a polyline representative of a route through the map data; sending a query for at least one video recorded on the route and recorded within a region bound by the selection window; receiving, in response to the query, at least a portion of the polyline including the at least one video recorded on the route and recorded within the region bound by the selection window; and/or presenting the portion of the polyline to enable selection and viewing of the least one video.

In the example embodiment, the processor 20 may be configured using computer code stored at memory 40 and/or 42 to perform operations as disclosed herein with respect to the process at FIG. 1B and/or the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 13, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing herein, a technical effect of one or more of the example embodiments disclosed herein may include enhanced end-user experience with respect to navigation.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. A method comprising:
    generating, by a user equipment, a user interface view including a map and a polyline representative of a route along the map;
    generating, by the user equipment, the polyline to include at least one graphically distinct indicator along the route, wherein the at least one graphically distinct indicator, upon selection at the user interface view, initiates presentation of at least one video recorded at a location on the route where the at least one graphically distinct indicator is located;
    generating, by the user equipment, a selection window on the user interface view, wherein the selection window overlays a portion of the user interface view and is configured to be user-adjustable such that the selection window is movable and adjustable to select a user-adjusted selection, the user-adjusted selection comprising a selected subset of the user interface view including a portion of the map, wherein the user-adjusted selection comprises a portion of the polyline and does not comprise at least one other portion of the polyline, wherein the portion of the polyline includes a corresponding graphically distinct indicator of a speed of a camera that recorded the at least one video at the location on the route where the at least one graphically distinct indicator is located;
    presenting, on the user equipment, the user-adjusted selection comprising the portion of the polyline;
    in response to the user-adjusted selection comprising the portion of the polyline, triggering a search for the at least one video associated with the portion of the polyline located within the user-adjusted selection to enable presentation of the at least one video, wherein the search for the at least one video specifies at least the speed corresponding to the graphically distinct indicator of the speed of the camera that recording the at least one video at the location, wherein a region bound by the user-adjusted selection defines a viewing start time and a viewing end time of the associated at least one video based on location information and time information stored with, or linked to, the associated at least one video, wherein the search further specifies the viewing start time, the viewing end time, and the location; and
    presenting, the at least one video obtained by the search, while inhibiting and/or blocking, by the user equipment, presentation of the at least one other portion of the polyline located outside of the user-adjusted selection.

2. The method of claim 1, wherein the at least one graphically distinct indicator comprises a color, a style, and/or a shading, wherein the color, the style, and/or the shading are varied in accordance with the speed.

3. The method of claim 1, wherein a first graphically distinct indicator is graphically different from a second graphically distinct indicator to indicate a difference in the speed.

4. The method of claim 1, wherein the route along the map comprises map data including the location information and the time information, wherein the time information enables a determination of the speed at the location corresponding to the at least one graphically distinct indicator.

5. The method of claim 1, further comprising
receiving, from a navigation system server and in response to the search, at least the portion of the polyline including the at least one video associated with the portion of the polyline.

6. The method of claim 5 further comprising:
receiving, in response to the search, map data comprising geographic features in a geographic region defined by the region bound by the user-adjusted selection.

7. The method of claim 6, wherein the map data comprises at least one of:
at least one road segment database record,
at least one node database record,
at least one pedestrian segment database record,
at least one orientation node database record, and
at least one image data record.

8. The method of claim 6, wherein the search is performed on a the navigation system server, wherein the navigation system server stores video data and the at least one video, wherein the video data is linked to, or stored with, at least the map data including the location information to enable searches queries for the at least one video.

9. The method of claim 8, wherein a location of the at least one video is adjusted to the location information of the map data.

10. The method of claim 1, further comprising:
varying a playback speed of the at least one video based on a shape of the polyline, a speed associated with the portion of the polyline, and/or the map data associated with the portion of the polyline.

11. The method of claim 1, wherein the at least one video within the region is presented sequentially based on time.

12. The method of claim 1, wherein the inhibiting and/or blocking, by the user equipment, further includes clipping at least a first portion of the at least one video indicated as obstructed based on a building model.

13. An apparatus comprising:
at least one processor; and
at least one memory including computer program code, the at least one memory and the computer program code configured to, with the at least one processor, cause the apparatus to at least:
generate a user interface view including a map and a polyline representative of a route along the map;
generate the polyline to include at least one graphically distinct indicator along the route, wherein the at least one graphically distinct indicator, when selected at the user interface view, initiates presentation of at least one video recorded at a location on the route where the at least one graphically distinct indicator is located;
generate a selection window on the user interface view, wherein the selection window overlays a portion of the user interface view and is configured to be user-adjustable such that the selection window is movable and adjustable to select a user-adjusted selection, the user-adjusted selection comprising a selected subset of the user interface view including a portion of the map, wherein the user-adjusted selection comprises a portion of the polyline and does not comprise at least one other portion of the polyline, wherein the portion of the polyline includes a corresponding graphically distinct indicator of a speed of a camera that recorded the at least one video at the location on the route where the at least one graphically distinct indicator is located;
present the user-adjusted selection comprising the portion of the polyline;
in response to the user-adjusted selection comprising the portion of the polyline, trigger a search for the at least one video associated with the portion of the polyline located within the user-adjusted selection to enable presentation of the at least one video, wherein the search for the at least one video specifies at least the speed corresponding to the graphically distinct indicator of the speed of the camera recording the at least one video at the location, wherein a region bound by the user-adjusted selection defines a viewing start time and a viewing end time of the associated at least one video based on location information and time information stored with, or linked to, the associated at least one video, wherein the search further specifies the viewing start time, the viewing end time, and the location; and
present, the at least one video obtained by the search, while inhibit and/or block presentation of at least one other portion of the polyline located outside of the user-adjusted selection.

14. The apparatus of claim 13, wherein the at least one graphically distinct indicator comprises a color, a style, and/or a shading, wherein the color, the style, and/or the shading are varied in accordance with the speed.

15. The apparatus of claim 13, wherein a first graphically distinct indicator is graphically different from a second graphically distinct indicator to indicate a difference in the speed.

* * * * *

UNITED STATES PATENT AND TRADEMARK OFFICE
CERTIFICATE OF CORRECTION

PATENT NO. : 11,709,070 B2
APPLICATION NO. : 14/832825
DATED : July 25, 2023
INVENTOR(S) : Ole Henry Dorum et al.

It is certified that error appears in the above-identified patent and that said Letters Patent is hereby corrected as shown below:

In the Claims

At Column 22, Claim number 1, Line number 47, should read:
"indicator of the speed of the camera that recorded the at least"

At Column 24, Claim number 13, Line number 30, should read:
"indicator of the speed of the camera that recorded the at"

Signed and Sealed this
Twenty-second Day of August, 2023

Katherine Kelly Vidal
*Director of the United States Patent and Trademark Office*